United States Patent
Bita et al.

(10) Patent No.: US 8,040,589 B2
(45) Date of Patent: Oct. 18, 2011

(54) DEVICES AND METHODS FOR ENHANCING BRIGHTNESS OF DISPLAYS USING ANGLE CONVERSION LAYERS

(75) Inventors: Ion Bita, San Jose, CA (US); Gang Xu, Cupertino, CA (US); Marek Mienko, San Jose, CA (US); Lai Wang, Milpitas, CA (US); Russell W. Gruhlke, Milpitas, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 133 days.

(21) Appl. No.: 12/369,630

(22) Filed: Feb. 11, 2009

(65) Prior Publication Data

US 2009/0201565 A1    Aug. 13, 2009

Related U.S. Application Data

(60) Provisional application No. 61/028,145, filed on Feb. 12, 2008.

(51) Int. Cl.
    *G02B 26/00*    (2006.01)
(52) U.S. Cl. ....................................... 359/290
(58) Field of Classification Search .......... 359/290, 359/291, 292, 295, 298, 558, 567, 572
    See application file for complete search history.

(56) References Cited

U.S. PATENT DOCUMENTS

| | | |
|---|---|---|
| 3,924,929 A | 12/1975 | Holmen |
| 4,154,219 A | 5/1979 | Gupta et al. |
| 4,375,312 A | 3/1983 | Tangonan |
| 4,378,567 A | 3/1983 | Mir |
| 4,850,682 A | 7/1989 | Gerritsen |
| 4,863,224 A | 9/1989 | Afian |
| 4,918,577 A | 4/1990 | Furudate |
| 4,974,942 A | 12/1990 | Gross |
| 5,050,946 A | 9/1991 | Hathaway |
| 5,123,247 A | 6/1992 | Nelson |
| 5,151,585 A | 9/1992 | Siebert |
| 5,226,099 A | 7/1993 | Mignardi et al. |
| 5,339,179 A | 8/1994 | Rudisill |

(Continued)

FOREIGN PATENT DOCUMENTS

CA    2 490 975    1/2004

(Continued)

OTHER PUBLICATIONS

Invitation to Pay Additional Fees dated May 29, 2009, Application No. PCT/US2009/033698.

(Continued)

*Primary Examiner* — Ricky Mack
*Assistant Examiner* — Tuyen Tra
(74) *Attorney, Agent, or Firm* — Knobbe, Martens, Olson & Bear LLP

(57) ABSTRACT

Various embodiments of the present invention relate to enhancing the brightness of displays that employ illumination systems. In some embodiments, the illumination systems include light guides, diffractive microstructure, and light-turning features. The diffractive microstructure may be configured to receive ambient light at a first angle and produce diffracted light at a second angle greater than the first angle and greater than the critical angle for of light guide. The light is thereby guided within the light guide. The light-turning features may be configured to turn the light guided within the light guide out of a light guide and onto, for example, a spatial light modulator at near normal incidence.

48 Claims, 14 Drawing Sheets

U.S. PATENT DOCUMENTS

| | | | |
|---|---|---|---|
| 5,398,125 A | 3/1995 | Willett | |
| 5,448,659 A | 9/1995 | Tsutsui et al. | |
| 5,452,385 A | 9/1995 | Izumi | |
| 5,459,610 A | 10/1995 | Bloom et al. | |
| 5,467,417 A | 11/1995 | Nakamura | |
| 5,481,385 A | 1/1996 | Zimmerman et al. | |
| 5,515,184 A | 5/1996 | Caulfield | |
| 5,555,160 A | 9/1996 | Tawara | |
| 5,592,332 A | 1/1997 | Nishio | |
| 5,594,830 A | 1/1997 | Winston | |
| 5,647,036 A | 7/1997 | Deacon et al. | |
| 5,650,865 A | 7/1997 | Smith | |
| 5,659,410 A | 8/1997 | Koike | |
| 5,671,314 A | 9/1997 | Gregory et al. | |
| 5,671,994 A | 9/1997 | Tai | |
| 5,673,128 A | 9/1997 | Ohta et al. | |
| 5,703,667 A | 12/1997 | Ochiai | |
| 5,712,694 A | 1/1998 | Taira et al. | |
| 5,735,590 A | 4/1998 | Kashima | |
| 5,771,124 A | 6/1998 | Kintz | |
| 5,771,321 A | 6/1998 | Stern | |
| 5,782,993 A | 7/1998 | Ponewash | |
| 5,783,614 A | 7/1998 | Chen et al. | |
| 5,805,117 A | 9/1998 | Mazurek | |
| 5,808,708 A | 9/1998 | Oyama et al. | |
| 5,810,464 A | 9/1998 | Ishikawa | |
| 5,815,229 A | 9/1998 | Shaprio | |
| 5,854,872 A | 12/1998 | Tai | |
| 5,883,684 A | 3/1999 | Millikan et al. | |
| 5,892,598 A | 4/1999 | Asakawa et al. | |
| 5,913,594 A | 6/1999 | Iimura | |
| 5,914,804 A | 6/1999 | Goossen | |
| 5,933,183 A | 8/1999 | Enomoto | |
| 5,956,106 A | 9/1999 | Petersen | |
| 5,961,198 A | 10/1999 | Hira | |
| 5,982,540 A | 11/1999 | Koike | |
| 5,991,073 A | 11/1999 | Woodgate et al. | |
| 5,999,239 A | 12/1999 | Larson | |
| 6,002,829 A | 12/1999 | Winston | |
| 6,014,192 A | 1/2000 | Lehureau | |
| 6,040,937 A | 3/2000 | Miles | |
| 6,048,071 A | 4/2000 | Sawayama | |
| 6,055,090 A | 4/2000 | Miles | |
| 6,072,620 A | 6/2000 | Shiono | |
| 6,073,034 A | 6/2000 | Jacobsen | |
| 6,074,069 A | 6/2000 | Chao-Ching | |
| 6,091,469 A | 7/2000 | Naito | |
| 6,099,134 A | 8/2000 | Taniguchi | |
| 6,123,431 A | 9/2000 | Teragaki | |
| 6,128,077 A | 10/2000 | Jovin | |
| 6,151,089 A | 11/2000 | Yang et al. | |
| 6,195,196 B1 | 2/2001 | Kimura | |
| 6,196,691 B1 | 3/2001 | Ochiai | |
| 6,199,989 B1 | 3/2001 | Maeda et al. | |
| 6,232,937 B1 | 5/2001 | Jacobsen | |
| 6,243,149 B1 | 6/2001 | Swanson et al. | |
| 6,259,082 B1 | 7/2001 | Fujimoto et al. | |
| 6,259,854 B1 | 7/2001 | Shinji | |
| 6,273,577 B1 | 8/2001 | Goto | |
| 6,282,010 B1 | 8/2001 | Sulzbach | |
| 6,322,901 B1 | 11/2001 | Bawendi | |
| 6,323,892 B1 | 11/2001 | Mihara | |
| 6,323,987 B1 | 11/2001 | Rinuado | |
| 6,371,623 B1 | 4/2002 | Toyoda | |
| 6,377,535 B1 * | 4/2002 | Chen et al. | 369/112.09 |
| 6,381,022 B1 | 4/2002 | Zavracky | |
| 6,407,785 B1 | 6/2002 | Yamazaki | |
| 6,412,969 B1 | 7/2002 | Torihara | |
| 6,454,452 B1 | 9/2002 | Sasagawa et al. | |
| 6,456,279 B1 | 9/2002 | Kubo | |
| 6,478,432 B1 | 11/2002 | Dyner | |
| 6,483,613 B1 | 11/2002 | Woodgate et al. | |
| 6,493,475 B1 | 12/2002 | Lin | |
| 6,504,589 B1 | 1/2003 | Kashima | |
| 6,512,626 B1 | 1/2003 | Schmidt | |
| 6,522,794 B1 | 2/2003 | Bischel et al. | |
| 6,538,813 B1 | 3/2003 | Magno | |
| 6,574,033 B1 | 6/2003 | Chui | |
| 6,577,429 B1 | 6/2003 | Kurtz | |
| 6,582,095 B1 | 6/2003 | Toyoda | |
| 6,592,234 B2 | 7/2003 | Epstein | |
| 6,598,987 B1 | 7/2003 | Parikka | |
| 6,603,520 B2 | 8/2003 | Umemoto | |
| 6,631,998 B2 | 10/2003 | Egawa et al. | |
| 6,636,322 B1 | 10/2003 | Terashita | |
| 6,636,358 B2 | 10/2003 | Umemoto et al. | |
| 6,642,913 B1 | 11/2003 | Kimura | |
| 6,643,067 B2 | 11/2003 | Miyamae | |
| 6,646,772 B1 | 11/2003 | Popvovich et al. | |
| 6,650,455 B2 | 11/2003 | Miles | |
| 6,652,109 B2 | 11/2003 | Nakamura | |
| 6,657,683 B2 | 12/2003 | Richard | |
| 6,660,997 B2 | 12/2003 | Laberge | |
| 6,667,782 B1 | 12/2003 | Taira et al. | |
| 6,669,350 B2 | 12/2003 | Yamashita | |
| 6,674,562 B1 | 1/2004 | Miles | |
| 6,680,792 B2 | 1/2004 | Miles | |
| 6,693,690 B2 | 2/2004 | Umemoto | |
| 6,697,403 B2 | 2/2004 | Lee et al. | |
| 6,709,123 B2 | 3/2004 | Flohr | |
| 6,738,194 B1 | 5/2004 | Ramirez | |
| 6,742,907 B2 | 6/2004 | Funamoto et al. | |
| 6,742,921 B2 | 6/2004 | Umemoto | |
| 6,747,801 B2 | 6/2004 | Umemoto | |
| 6,751,023 B2 | 6/2004 | Umemoto et al. | |
| 6,760,135 B1 | 7/2004 | Payne | |
| 6,761,461 B2 | 7/2004 | Mizutani et al. | |
| 6,773,126 B1 | 8/2004 | Hatjasalo | |
| 6,778,746 B2 | 8/2004 | Charlton | |
| 6,784,948 B2 | 8/2004 | Kawashima et al. | |
| 6,792,293 B1 | 9/2004 | Awan et al. | |
| 6,794,119 B2 | 9/2004 | Miles | |
| 6,819,380 B2 | 11/2004 | Wen et al. | |
| 6,822,745 B2 | 11/2004 | De Groot et al. | |
| 6,826,000 B2 | 11/2004 | Lee et al. | |
| 6,841,787 B2 | 1/2005 | Almogy | |
| 6,852,396 B1 | 2/2005 | Mineo | |
| 6,853,418 B2 | 2/2005 | Suzuki et al. | |
| 6,862,141 B2 | 3/2005 | Olczak | |
| 6,864,882 B2 | 3/2005 | Newton | |
| 6,865,312 B2 | 3/2005 | Niv et al. | |
| 6,879,354 B1 | 4/2005 | Sawayama | |
| 6,883,924 B2 | 4/2005 | Maeda et al. | |
| 6,883,934 B2 | 4/2005 | Kawakami | |
| 6,891,530 B2 | 5/2005 | Umemoto | |
| 6,897,855 B1 | 5/2005 | Matthies | |
| 6,930,816 B2 | 8/2005 | Mochizuki | |
| 6,940,653 B2 | 9/2005 | Favalora et al. | |
| 6,951,401 B2 | 10/2005 | Van Hees et al. | |
| 6,961,045 B2 | 11/2005 | Tsao | |
| 6,964,484 B2 | 11/2005 | Gupta | |
| 6,967,779 B2 | 11/2005 | Fadel et al. | |
| 6,998,196 B2 * | 2/2006 | Rich et al. | 430/1 |
| 6,999,235 B2 | 2/2006 | Nakamura | |
| 7,002,726 B2 | 2/2006 | Patel | |
| 7,009,754 B2 | 3/2006 | Huibers | |
| 7,010,212 B2 | 3/2006 | Emmons et al. | |
| 7,012,659 B2 | 3/2006 | Smith et al. | |
| 7,018,088 B2 | 3/2006 | Yu | |
| 7,025,461 B2 | 4/2006 | Veligdan | |
| 7,030,949 B2 | 4/2006 | Kashima | |
| 7,042,444 B2 | 5/2006 | Cok | |
| 7,042,643 B2 | 5/2006 | Miles | |
| 7,046,409 B2 | 5/2006 | Kihara | |
| 7,054,045 B2 | 5/2006 | McPheters | |
| 7,056,001 B2 | 6/2006 | Chuang | |
| 7,061,226 B2 | 6/2006 | Durr | |
| 7,064,875 B2 | 6/2006 | Kawano | |
| 7,068,948 B2 | 6/2006 | Wei et al. | |
| 7,072,093 B2 | 7/2006 | Piehl | |
| 7,072,096 B2 | 7/2006 | Holman et al. | |
| 7,110,158 B2 | 9/2006 | Miles | |
| 7,113,339 B2 | 9/2006 | Taguchi et al. | |
| 7,123,216 B1 | 10/2006 | Miles | |
| 7,133,022 B2 | 11/2006 | Grabert | |
| 7,138,984 B1 | 11/2006 | Miles | |
| 7,142,347 B2 | 11/2006 | Islam | |

| | | |
|---|---|---|
| 7,156,546 B2 | 1/2007 | Higashiyama |
| 7,161,136 B1 | 1/2007 | Wenstrand |
| 7,161,730 B2 | 1/2007 | Floyd |
| 7,180,672 B2 | 2/2007 | Olczak |
| 7,206,133 B2 | 4/2007 | Cassarly |
| 7,212,345 B2 | 5/2007 | Wilson |
| 7,218,429 B2 | 5/2007 | Batchko |
| 7,218,812 B2 | 5/2007 | Maxwell |
| 7,221,418 B2 | 5/2007 | Lee |
| 7,223,010 B2 | 5/2007 | Min |
| 7,262,754 B1 | 8/2007 | Yamazaki |
| 7,262,916 B2 | 8/2007 | Kao |
| 7,278,774 B2 | 10/2007 | Chang |
| 7,324,284 B2 | 1/2008 | Olczak |
| 7,342,705 B2 | 3/2008 | Chui et al. |
| 7,342,709 B2 | 3/2008 | Lin |
| 7,346,251 B2 | 3/2008 | Bose |
| 7,352,501 B2 | 4/2008 | Chopra et al. |
| 7,352,940 B2 | 4/2008 | Charters |
| 7,355,780 B2 | 4/2008 | Chui |
| 7,357,552 B2 | 4/2008 | Takada |
| 7,357,557 B2 | 4/2008 | Miyashita |
| 7,359,011 B2 | 4/2008 | Hamada |
| 7,360,899 B2 | 4/2008 | McGuire |
| 7,366,393 B2 | 4/2008 | Cassarly |
| 7,369,292 B2 | 5/2008 | Xu et al. |
| 7,376,308 B2 | 5/2008 | Cheben et al. |
| 7,377,678 B2 | 5/2008 | Huang |
| 7,380,969 B2 | 6/2008 | Yamashita |
| 7,380,970 B2 | 6/2008 | Hwang |
| 7,388,181 B2 * | 6/2008 | Han et al. ............. 250/205 |
| 7,389,476 B2 | 6/2008 | Senda et al. |
| 7,403,180 B1 | 7/2008 | Silverstein et al. |
| 7,417,784 B2 | 8/2008 | Sasagawa |
| 7,450,295 B2 | 11/2008 | Tung |
| 7,456,805 B2 | 11/2008 | Ouderkirk |
| 7,477,809 B1 | 1/2009 | Tan et al. |
| 7,508,571 B2 | 3/2009 | Gally |
| 7,515,336 B2 | 4/2009 | Lippey |
| 7,532,800 B2 | 5/2009 | Iimura |
| 7,545,569 B2 | 6/2009 | Cassarly |
| 7,561,133 B2 | 7/2009 | Mestha |
| 7,564,612 B2 | 7/2009 | Chui |
| 7,603,001 B2 | 10/2009 | Wang |
| 7,630,123 B2 | 12/2009 | Kothari |
| 7,643,203 B2 | 1/2010 | Gousev et al. |
| 7,663,714 B2 | 2/2010 | Haga et al. |
| 7,688,494 B2 | 3/2010 | Xu et al. |
| 7,706,050 B2 | 4/2010 | Sampsell |
| 7,733,439 B2 | 6/2010 | Sampsell |
| 7,750,886 B2 | 7/2010 | Sampsell |
| 7,766,498 B2 | 8/2010 | Sampsell |
| 7,777,954 B2 | 8/2010 | Gruhike |
| 7,813,026 B2 | 10/2010 | Sampsell |
| 7,813,029 B2 | 10/2010 | Kothari et al. |
| 7,845,841 B2 | 12/2010 | Sampsell |
| 7,907,319 B2 | 3/2011 | Miles |
| 2001/0003504 A1 | 6/2001 | Ishihara |
| 2001/0010630 A1 | 8/2001 | Umemoto |
| 2001/0019380 A1 | 9/2001 | Ishihara |
| 2001/0019479 A1 | 9/2001 | Nakabayashi |
| 2001/0022636 A1 | 9/2001 | Yang et al. |
| 2001/0030861 A1 | 10/2001 | Oda |
| 2001/0049061 A1 | 12/2001 | Nakagaki |
| 2001/0055208 A1 | 12/2001 | Kimura |
| 2002/0006036 A1 | 1/2002 | Egawa |
| 2002/0034071 A1 | 3/2002 | Mabuchi |
| 2002/0044445 A1 | 4/2002 | Bohler |
| 2002/0051354 A1 | 5/2002 | Egawa |
| 2002/0054258 A1 | 5/2002 | Kondo |
| 2002/0075555 A1 | 6/2002 | Miles |
| 2002/0080465 A1 | 6/2002 | Han |
| 2002/0105699 A1 | 8/2002 | Miracky |
| 2002/0106182 A1 | 8/2002 | Kawashima |
| 2002/0126364 A1 * | 9/2002 | Miles ............. 359/247 |
| 2002/0135560 A1 | 9/2002 | Akaoka |
| 2002/0149584 A1 | 10/2002 | Simpson |
| 2002/0154256 A1 | 10/2002 | Gotoh |
| 2002/0172039 A1 | 11/2002 | Inditsky |
| 2003/0012009 A1 | 1/2003 | Suzuki |
| 2003/0016930 A1 | 1/2003 | Inditsky |
| 2003/0030764 A1 | 2/2003 | Lee |
| 2003/0034445 A1 | 2/2003 | Boyd |
| 2003/0067760 A1 | 4/2003 | Jagt |
| 2003/0071947 A1 | 4/2003 | Shiraogawa |
| 2003/0081154 A1 | 5/2003 | Coleman |
| 2003/0083429 A1 | 5/2003 | Smith |
| 2003/0086030 A1 | 5/2003 | Taniguchi |
| 2003/0086031 A1 | 5/2003 | Taniguchi |
| 2003/0090887 A1 | 5/2003 | Igarashi |
| 2003/0095401 A1 | 5/2003 | Hanson |
| 2003/0098957 A1 | 5/2003 | Haldiman |
| 2003/0099118 A1 | 5/2003 | Saitoh |
| 2003/0103177 A1 | 6/2003 | Maeda et al. |
| 2003/0103344 A1 | 6/2003 | Niida |
| 2003/0123245 A1 | 7/2003 | Parker |
| 2003/0151821 A1 | 8/2003 | Favalora |
| 2003/0160919 A1 | 8/2003 | Suzuki |
| 2003/0161040 A1 | 8/2003 | Ishii |
| 2003/0165067 A1 | 9/2003 | Imamura |
| 2003/0169385 A1 | 9/2003 | Okuwaki |
| 2003/0184690 A1 | 10/2003 | Ogiwara |
| 2003/0184989 A1 | 10/2003 | Matsumoto et al. |
| 2003/0193630 A1 | 10/2003 | Chiou |
| 2003/0210222 A1 | 11/2003 | Ogiwara |
| 2003/0210363 A1 | 11/2003 | Yasukawa |
| 2003/0210367 A1 | 11/2003 | Nakano |
| 2003/0214728 A1 | 11/2003 | Olczak |
| 2003/0231483 A1 | 12/2003 | Higashiyama |
| 2004/0001169 A1 | 1/2004 | Saiki |
| 2004/0017599 A1 | 1/2004 | Yang |
| 2004/0027315 A1 | 2/2004 | Senda et al. |
| 2004/0032401 A1 | 2/2004 | Nakazawa |
| 2004/0032659 A1 | 2/2004 | Drinkwater |
| 2004/0042233 A1 | 3/2004 | Suzuki |
| 2004/0070711 A1 | 4/2004 | Wen |
| 2004/0080938 A1 | 4/2004 | Holman |
| 2004/0085748 A1 | 5/2004 | Sugiura |
| 2004/0100796 A1 | 5/2004 | Ward |
| 2004/0109305 A1 | 6/2004 | Chisholm |
| 2004/0125048 A1 | 7/2004 | Fukuda |
| 2004/0135494 A1 | 7/2004 | Miyatake |
| 2004/0170373 A1 | 9/2004 | Kim |
| 2004/0174583 A1 | 9/2004 | Chen et al. |
| 2004/0188599 A1 | 9/2004 | Viktorovitch |
| 2004/0207995 A1 | 10/2004 | Park |
| 2004/0217264 A1 | 11/2004 | Wood |
| 2004/0228109 A1 | 11/2004 | Leu |
| 2004/0228112 A1 | 11/2004 | Takata |
| 2004/0246743 A1 | 12/2004 | Lee |
| 2005/0002082 A1 | 1/2005 | Miles |
| 2005/0002175 A1 | 1/2005 | Matsui et al. |
| 2005/0024849 A1 | 2/2005 | Parker |
| 2005/0024890 A1 | 2/2005 | Yamamoto |
| 2005/0030732 A1 | 2/2005 | Kimura |
| 2005/0041175 A1 | 2/2005 | Akiyama |
| 2005/0046011 A1 | 3/2005 | Chen |
| 2005/0069254 A1 | 3/2005 | Schultheis |
| 2005/0120553 A1 | 6/2005 | Brown |
| 2005/0133761 A1 | 6/2005 | Thielemans |
| 2005/0141065 A1 | 6/2005 | Masamoto |
| 2005/0146897 A1 | 7/2005 | Mimura |
| 2005/0185416 A1 | 8/2005 | Lee |
| 2005/0195175 A1 | 9/2005 | Anderson |
| 2005/0206802 A1 | 9/2005 | Creemers |
| 2005/0231977 A1 | 10/2005 | Hayakawa |
| 2005/0231981 A1 | 10/2005 | Hoelen et al. |
| 2005/0248524 A1 | 11/2005 | Feng |
| 2005/0254771 A1 | 11/2005 | Yamashita |
| 2005/0259939 A1 | 11/2005 | Rinko |
| 2005/0270798 A1 | 12/2005 | Lee |
| 2005/0271325 A1 | 12/2005 | Anderson |
| 2005/0286113 A1 | 12/2005 | Miles |
| 2006/0001942 A1 | 1/2006 | Chui |
| 2006/0002141 A1 | 1/2006 | Ouderkirk |
| 2006/0002675 A1 | 1/2006 | Choi |
| 2006/0024017 A1 | 2/2006 | Page |
| 2006/0044523 A1 | 3/2006 | Teijido |

| | | | | | | |
|---|---|---|---|---|---|---|
| 2006/0050032 | A1 | 3/2006 | Gunner | 2009/0101623 | A1 | 4/2009 | Bita et al. |
| 2006/0051048 | A1 | 3/2006 | Gardiner | 2009/0103166 | A1 | 4/2009 | Khazeni et al. |
| 2006/0061705 | A1 | 3/2006 | Onishi | 2009/0126777 | A1 | 5/2009 | Khazeni et al. |
| 2006/0062016 | A1 | 3/2006 | Dejima | 2009/0126792 | A1 | 5/2009 | Gruhlke |
| 2006/0066541 | A1 | 3/2006 | Gally | 2009/0135469 | A1 | 5/2009 | Lee et al. |
| 2006/0066586 | A1 | 3/2006 | Gally | 2009/0147332 | A1 | 6/2009 | Bita et al. |
| 2006/0066783 | A1 | 3/2006 | Sampsell | 2009/0147535 | A1 | 6/2009 | Mienko |
| 2006/0066935 | A1 | 3/2006 | Cummings | 2009/0168459 | A1 | 7/2009 | Holman |
| 2006/0072315 | A1 | 4/2006 | Han et al. | 2009/0190373 | A1 | 7/2009 | Bita et al. |
| 2006/0072339 | A1 | 4/2006 | Li et al. | 2009/0196068 | A1 | 8/2009 | Wang |
| 2006/0077124 | A1 | 4/2006 | Gally | 2009/0199893 | A1 | 8/2009 | Bita |
| 2006/0077514 | A1 | 4/2006 | Sampsell | 2009/0199900 | A1 | 8/2009 | Bita |
| 2006/0083028 | A1 | 4/2006 | Sun et al. | 2009/0201301 | A1 | 8/2009 | Mienko |
| 2006/0110090 | A1 | 5/2006 | Ellwood | 2009/0201565 | A1 | 8/2009 | Bita et al. |
| 2006/0114244 | A1 | 6/2006 | Saxena | 2009/0201571 | A1 | 8/2009 | Gally |
| 2006/0126142 | A1 | 6/2006 | Choi | 2009/0231877 | A1 | 9/2009 | Mienko |
| 2006/0132383 | A1 | 6/2006 | Gally | 2009/0251752 | A1 | 10/2009 | Gruhlke |
| 2006/0164861 | A1 | 7/2006 | Maeda | 2009/0251783 | A1 | 10/2009 | Huibers |
| 2006/0181866 | A1 | 8/2006 | Jung | 2009/0257108 | A1 | 10/2009 | Gruhlke |
| 2006/0181903 | A1 | 8/2006 | Okuwaki | 2009/0296193 | A1 | 12/2009 | Bita et al. |
| 2006/0187676 | A1 | 8/2006 | Ishikura | 2009/0303417 | A1 | 12/2009 | Mizushima et al. |
| 2006/0198013 | A1 | 9/2006 | Sampsell | 2009/0303746 | A1 | 12/2009 | Wang |
| 2006/0209012 | A1 | 9/2006 | Hagood, IV | 2009/0310208 | A1 | 12/2009 | Wang |
| 2006/0209385 | A1 | 9/2006 | Liu | 2009/0320899 | A1 | 12/2009 | Schiavoni |
| 2006/0215958 | A1 | 9/2006 | Yeo | 2009/0323144 | A1 | 12/2009 | Gruhlke |
| 2006/0262562 | A1 | 11/2006 | Fukasawa | 2009/0323153 | A1 | 12/2009 | Sampsell |
| 2006/0265919 | A1 | 11/2006 | Huang | 2010/0026727 | A1 | 2/2010 | Bita et al. |
| 2006/0268574 | A1 | 11/2006 | Jung | 2010/0033988 | A1 | 2/2010 | Chiu |
| 2006/0274400 | A1 | 12/2006 | Miles | 2010/0051089 | A1 | 3/2010 | Khazeni |
| 2006/0285356 | A1 | 12/2006 | Tseng | 2010/0053148 | A1 | 3/2010 | Khazeni |
| 2007/0064294 | A1 | 3/2007 | Hoshino et al. | 2010/0141557 | A1 | 6/2010 | Gruhlke |
| 2007/0081360 | A1 | 4/2007 | Bailey | 2010/0149624 | A1 | 6/2010 | Kothari |
| 2007/0097694 | A1 | 5/2007 | Faase | 2010/0157406 | A1 | 6/2010 | Gruhlke |
| 2007/0116424 | A1 | 5/2007 | Ting | 2010/0172012 | A1 | 7/2010 | Sampsell |
| 2007/0133226 | A1 | 6/2007 | Mi | 2010/0177533 | A1 | 7/2010 | Griffiths |
| 2007/0133935 | A1 | 6/2007 | Fine | 2010/0182308 | A1 | 7/2010 | Holman |
| 2007/0147087 | A1 | 6/2007 | Parker | 2010/0188367 | A1 | 7/2010 | Nagafuji et al. |
| 2007/0153243 | A1 | 7/2007 | Mestha et al. | | | | |
| 2007/0171330 | A1 | 7/2007 | Hung | | | FOREIGN PATENT DOCUMENTS | |
| 2007/0171418 | A1 | 7/2007 | Nyhart | CN | 1381752 | 11/2002 | |
| 2007/0177405 | A1 | 8/2007 | Chan | CN | 1639596 A | 7/2005 | |
| 2007/0187852 | A1 | 8/2007 | Parker et al. | CN | 1643439 A | 7/2005 | |
| 2007/0189036 | A1 | 8/2007 | Chen | CN | 1755494 A | 4/2006 | |
| 2007/0196040 | A1 | 8/2007 | Wang | CN | 1795403 A | 6/2006 | |
| 2007/0201234 | A1 | 8/2007 | Ottermann | CN | 101226259 | 7/2008 | |
| 2007/0210163 | A1 | 9/2007 | Han | DE | 34 02 746 | 8/1985 | |
| 2007/0229737 | A1 | 10/2007 | Takeda | DE | 196 22 748 | 12/1997 | |
| 2007/0229936 | A1 | 10/2007 | Miles | DE | 199 42 513 | 3/2001 | |
| 2007/0241340 | A1 | 10/2007 | Pan | DE | 102007025092 | 12/2008 | |
| 2007/0253054 | A1 | 11/2007 | Miles | EP | 0 278 038 | 8/1988 | |
| 2007/0253717 | A1 | 11/2007 | Charters | EP | 0 539 099 | 4/1993 | |
| 2007/0268695 | A1 | 11/2007 | Seetzen | EP | 0 590 511 | 4/1994 | |
| 2007/0279727 | A1 | 12/2007 | Gandhi | EP | 0 621 500 | 10/1994 | |
| 2007/0279935 | A1 | 12/2007 | Gardiner | EP | 0 822 441 | 2/1998 | |
| 2007/0285406 | A1 | 12/2007 | Kukulj | EP | 0 879 991 | 11/1998 | |
| 2007/0291362 | A1* | 12/2007 | Hill et al. .................. 359/567 | EP | 0 907 050 | 4/1999 | |
| 2007/0292091 | A1 | 12/2007 | Fujii | EP | 0 957 392 | 11/1999 | |
| 2008/0030650 | A1 | 2/2008 | Kitagawa | EP | 0 984 314 | 3/2000 | |
| 2008/0049445 | A1 | 2/2008 | Harbers | EP | 1 089 115 | 4/2001 | |
| 2008/0049450 | A1 | 2/2008 | Sampsell | EP | 1 093 105 | 4/2001 | |
| 2008/0074402 | A1 | 3/2008 | Cornish | EP | 1 113 218 | 7/2001 | |
| 2008/0079687 | A1 | 4/2008 | Cernasov | EP | 1 116 987 | 7/2001 | |
| 2008/0084600 | A1 | 4/2008 | Bita et al. | EP | 1 127 984 | 8/2001 | |
| 2008/0084602 | A1 | 4/2008 | Xu | EP | 1 143 270 | 10/2001 | |
| 2008/0090025 | A1 | 4/2008 | Freking | EP | 1 199 512 | 4/2002 | |
| 2008/0094853 | A1 | 4/2008 | Kim | EP | 1 251 454 | 10/2002 | |
| 2008/0100900 | A1 | 5/2008 | Chui | EP | 1 271 223 | 1/2003 | |
| 2008/0112039 | A1 | 5/2008 | Chui | EP | 1 296 094 | 3/2003 | |
| 2008/0151347 | A1 | 6/2008 | Chui | EP | 1 306 609 | 5/2003 | |
| 2008/0170414 | A1 | 7/2008 | Wang | EP | 1 329 664 | 7/2003 | |
| 2008/0192484 | A1 | 8/2008 | Lee | EP | 1 336 876 | 8/2003 | |
| 2008/0232135 | A1 | 9/2008 | Kinder | EP | 1 347 315 | 9/2003 | |
| 2008/0266333 | A1 | 10/2008 | Silverstein et al. | EP | 1 389 775 | 2/2004 | |
| 2008/0285307 | A1 | 11/2008 | Aylward | EP | 1 413 543 | 4/2004 | |
| 2009/0050454 | A1 | 2/2009 | Matsukawa | EP | 1 437 610 | 7/2004 | |
| 2009/0059346 | A1 | 3/2009 | Xu | EP | 1 445 629 | 8/2004 | |
| 2009/0086466 | A1 | 4/2009 | Sugita | EP | 1 519 218 | 3/2005 | |
| 2009/0090611 | A1 | 4/2009 | Zeijlon | EP | 1 531 302 | 5/2005 | |
| 2009/0097100 | A1 | 4/2009 | Gally | EP | 1 544 537 | 6/2005 | |

| | | |
|---|---|---|
| EP | 1 577 701 | 9/2005 |
| EP | 1 640 961 | 3/2006 |
| EP | 1 698 918 | 9/2006 |
| EP | 1 732 141 A | 12/2006 |
| EP | 1 734 401 | 12/2006 |
| EP | 1 748 305 | 1/2007 |
| EP | 1 762 778 A | 3/2007 |
| EP | 1 832 806 | 9/2007 |
| EP | 1 870 635 | 12/2007 |
| FR | 2 889 597 A | 2/2007 |
| GB | 2 260 203 | 4/1993 |
| GB | 2 278 222 | 11/1994 |
| GB | 2 315 356 | 1/1998 |
| GB | 2 321 532 | 7/1998 |
| GB | 2 336 933 | 3/1999 |
| GB | 2 331 615 | 5/1999 |
| GB | 2 340 281 | 2/2000 |
| GB | 2 351 834 | 1/2001 |
| JP | 60 242408 | 12/1985 |
| JP | 05 281479 | 10/1993 |
| JP | 07-509327 | 10/1995 |
| JP | 09 022012 | 1/1997 |
| JP | WO 97/17628 | 5/1997 |
| JP | 09 160032 | 6/1997 |
| JP | 09-507920 | 8/1997 |
| JP | 09 311333 | 12/1997 |
| JP | 10 202948 | 8/1998 |
| JP | 11 174234 | 7/1999 |
| JP | 11 211999 | 8/1999 |
| JP | 11 231321 | 8/1999 |
| JP | 11 232919 | 8/1999 |
| JP | 2000-028933 | 1/2000 |
| JP | 2000 075293 | 3/2000 |
| JP | 2000 081848 | 3/2000 |
| JP | 2000 181367 | 6/2000 |
| JP | 2000 193933 | 7/2000 |
| JP | 2000 214804 A | 8/2000 |
| JP | 2000 514568 | 10/2000 |
| JP | 2000 305074 | 11/2000 |
| JP | 2001-021883 | 1/2001 |
| JP | 2001 305312 | 10/2001 |
| JP | 2001 343514 | 12/2001 |
| JP | 2002 72284 | 3/2002 |
| JP | 2002 090549 | 3/2002 |
| JP | 2002-108227 | 4/2002 |
| JP | 2002 174732 | 6/2002 |
| JP | 2002 196151 | 7/2002 |
| JP | 2002 245835 | 8/2002 |
| JP | 2002-297044 | 10/2002 |
| JP | 2003 007114 | 1/2003 |
| JP | 2003 057652 | 2/2003 |
| JP | 2003 057653 | 2/2003 |
| JP | 2003 066451 | 3/2003 |
| JP | 2003-149642 | 5/2003 |
| JP | 2003-149643 | 5/2003 |
| JP | 2003 173713 | 6/2003 |
| JP | 2003 177336 | 6/2003 |
| JP | 2003 188959 | 7/2003 |
| JP | 2003-315694 | 11/2003 |
| JP | 2003 344881 | 12/2003 |
| JP | 2004-012918 | 1/2004 |
| JP | 2004-062099 | 2/2004 |
| JP | 2004-510185 | 4/2004 |
| JP | 2004-206049 | 7/2004 |
| JP | 2004-534280 A | 11/2004 |
| JP | 2005-259365 | 9/2005 |
| JP | 2005-316178 | 11/2005 |
| JP | 2006-065360 A | 3/2006 |
| JP | 2006 107993 | 4/2006 |
| JP | 2006 120571 | 5/2006 |
| JP | 2007-218540 A | 8/2007 |
| JP | 2008 103110 | 5/2008 |
| JP | 2009 0300966 | 12/2009 |
| TW | 567388 | 12/2003 |
| WO | WO 94/06871 A1 | 3/1994 |
| WO | WO 95/01584 | 1/1995 |
| WO | WO 95/14256 | 5/1995 |
| WO | WO 96/16348 | 5/1996 |
| WO | WO 97/01240 | 1/1997 |
| WO | WO 97/16756 | 5/1997 |
| WO | WO 97/46908 | 12/1997 |
| WO | WO 98/19201 | 5/1998 |
| WO | WO 98/32047 | 7/1998 |
| WO | WO 98/35182 | 8/1998 |
| WO | WO 99/04296 A | 1/1999 |
| WO | WO 99/63394 | 12/1999 |
| WO | WO 99/64785 A | 12/1999 |
| WO | WO 00/50807 | 8/2000 |
| WO | WO 01/29148 | 4/2001 |
| WO | WO 01/57434 | 8/2001 |
| WO | WO 01/81994 | 11/2001 |
| WO | WO 01/84228 | 11/2001 |
| WO | WO 01/84229 | 11/2001 |
| WO | WO 02/06858 | 1/2002 |
| WO | WO 02/071132 | 9/2002 |
| WO | WO 02/097324 | 12/2002 |
| WO | WO 03/007049 | 1/2003 |
| WO | WO 03/038509 | 5/2003 |
| WO | WO 03/056876 | 7/2003 |
| WO | WO 03/062912 | 7/2003 |
| WO | WO 2004/003643 | 1/2004 |
| WO | WO 2004/006003 | 1/2004 |
| WO | WO 2004/015489 | 2/2004 |
| WO | WO 2004/027514 | 4/2004 |
| WO | WO 2004/036270 | 4/2004 |
| WO | WO 2004/088372 | 10/2004 |
| WO | WO 2004/114418 | 12/2004 |
| WO | WO 2005/011012 | 2/2005 |
| WO | WO 2005/076051 | 8/2005 |
| WO | WO 2005/088367 | 9/2005 |
| WO | WO 2005/111669 | 11/2005 |
| WO | WO 2006/008702 | 1/2006 |
| WO | WO 2006/036451 | 4/2006 |
| WO | WO 2006/036496 | 4/2006 |
| WO | WO 2007/064133 | 6/2007 |
| WO | WO 2007/094558 | 8/2007 |
| WO | WO 2008/038754 | 4/2008 |
| WO | WO 2008/045200 | 4/2008 |
| WO | WO 2008/045207 | 4/2008 |
| WO | WO 2008/045218 | 4/2008 |
| WO | WO 2008/045311 | 4/2008 |
| WO | WO 2008/045364 | 4/2008 |
| WO | WO 2008/145096 | 12/2008 |
| WO | WO 2009/011922 A1 | 1/2009 |
| WO | WO 2009/102731 | 8/2009 |

OTHER PUBLICATIONS

International Search Report and Written Opinion in PCT/US2009/033698; (Publication No. WO 2009/102731) dated Oct. 9, 2009.

Partial International Search Report in PCT/US2009/033698 (Publication No. WO 2009/102731) dated May 29, 2009.

International Preliminary Report on Patentability in PCT/US2009/033698 (Publication No. WO 2009/102731) dated Aug. 17, 2010.

Fan et al., "Channel Drop Filters in Photonic Crystals", Optics Express, vol. 3, No. 1, pp. 4-11, 1998.

Giles et al., "Silicon MEMS Optical Switch Attenuator and Its Use in Lightwave Subsystems", IEEE Journal of Selected Topics in Quantum Electronics, vol. 5. No. 1, pp. 18-25, Jan./Feb. 1999.

Little et al., "Vertically Coupled Microring Rosonator Channel Dropping Filter", IEEE Photonics Technology Letters, vol. 11, No. 2, pp. 215-217, 1999.

Magel, "Integrated Optic Devices Using Micromachined Metal Membranes", SPIE vol. 2686, 0-8194-2060-3, pp. 54-63, 1996.

Mehregany et al., "MEMS Applications in Optical Systems", IEEE/LEOS 1996 Summer Topical Meetings, pp. 75-76, Aug. 5-9, 1996.

Oliner, "Radiating Elements and Mutual Coupling," Microwave Scanning Antennas, vol. 2, pp. 131-157 and pp. 190-194, 1966.

Zhou et al., "Waveguide Panel Display Using Electromechanical Spatial Modulators" SID Digest, vol. XXIX, 1998.

Imenes et al., "Spectral beam splitting technology for increased conversion efficiency in solar concentrating systems: a review" Solar Energy Materials, Elsevier Science Publishers B.V. Amsterdam, NL, vol. 84, Oct. 1, 2004, pp. 19-69, XP002474546.

Goosen, "MEMS-Based Variable Optical Interference Devices", IEEE/LEOS International Conference on Optical MEMS, pp. 17-18, Aug. 2000.

Neal T.D. et al. "Surface Plasmon enhanced emission from dye doped polymer layers," Optics Express Opt. Soc. America, USA, vol. 13, No. 14, pp. 5522-5527, Jul. 11, 2005.

Obi et al. Fabrication of Optical MEMS in SOL-GEL Materials; IEEE/LEOS International Conference on Optical MEMS, pp. 39-40, Aug. 2002.

* cited by examiner

| | Column Output Signals | |
|---|---|---|
| | $+V_{bias}$ | $-V_{bias}$ |
| Row Output Signals  0 | Stable | Stable |
| $+\Delta V$ | Relax | Actuate |
| $-\Delta V$ | Actuate | Relax |

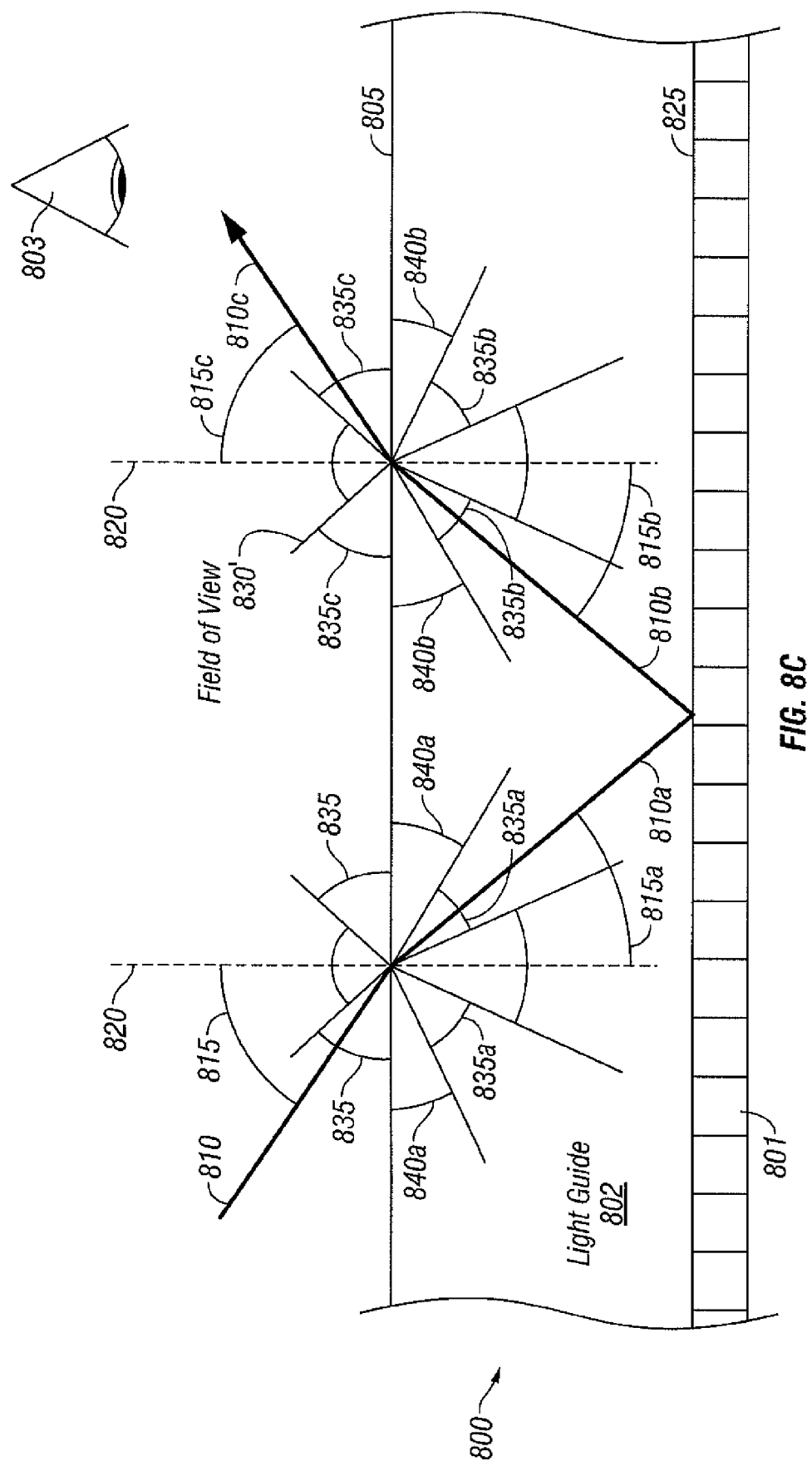

DEVICES AND METHODS FOR ENHANCING BRIGHTNESS OF DISPLAYS USING ANGLE CONVERSION LAYERS

This application claims priority to U.S. Provisional Patent Application No. 61/028,145, filed Feb. 12, 2008, which is incorporated herein by reference in its entirety.

BACKGROUND

1. Field of the Invention

Embodiments of the present invention relate to enhancing brightness of reflective displays. In some embodiments, devices include a light-turning features and diffractive microstructure.

2. Description of Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

In some embodiments, an illumination apparatus is provided, the apparatus comprising a light guide that guides light propagating therein at an angle greater than a critical angle for the light guide and ejects light from the light guide to provide illumination; diffractive microstructure disposed to receive ambient light at a first angle smaller than said critical angle and to diffract said ambient light to produce diffracted light at a second larger angle; and light-turning features configured to turn the diffracted light and direct the turned light out of the light guide. The second angle may be greater than the critical angle of the light guide.

In some embodiments, a method of manufacturing an illumination apparatus is provided, the method including providing a light guide that guides light propagating therein at an angle greater than a critical angle for the light guide and ejects light therefrom to provide illumination; disposing diffractive microstructure to receive ambient light at a first angle smaller than said critical angle and to diffract said ambient light to produce diffracted light at a second larger angle; and providing light-turning features configured to turn the diffracted light and direct the turned light out of the light guide.

In some embodiments, an illumination apparatus is provided, the illumination apparatus comprising means for guiding light propagating therein at an angle greater than a critical angle for the light guiding means and ejecting light from the light guiding means to provide illumination; means for diffracting ambient light received at a first angle smaller than said critical angle to produce diffracted light at a second larger angle; and means for turning the diffracted light and directing the turned light out of said light guiding means.

In some embodiments, an illumination apparatus is provided, the illumination apparatus comprising a light guide that guides light propagating therein at an angle greater than a critical angle for the light guide and ejects light from the light guide to provide illumination; and an angle converting structure disposed to receive ambient light at a first angle greater than said critical angle and to diffract said ambient light to produce diffracted light at a second smaller angle, wherein a refractive index of said angle converting structure is less than a refractive index of said light guide.

BRIEF DESCRIPTION OF THE DRAWINGS

FIG. 8C schematically illustrates light incident on a display device at an angle outside the field-of-view of the display device such that the light is reflected outside the field-of-view of the display device.

DETAILED DESCRIPTION OF THE PREFERRED EMBODIMENT

The following detailed description is directed to certain specific embodiments. However, the teachings herein can be applied in a multitude of different ways. In this description, reference is made to the drawings wherein like parts are designated with like numerals throughout. The embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

The perceived brightness of reflective displays can depend on available lighting. In various embodiments of the present invention, an illumination apparatus for front illuminating reflective display elements is configured to increase the amount of ambient light that is incident on the display elements and reflected therefrom within a usable field-of-view to the viewer. This illumination apparatus may comprise a light guide, light-diffractive microstructure, and turning features. The diffractive microstructure diffracts light incident on the illumination apparatus at an angle outside the field-of-view away from the normal to the array of display elements such that ambient light outside the field-of-view may be coupled into the light guide. The light turning features turn this light guided within the light guide to the display elements at an angle near normal to the array of display elements. Therefore, the amount of ambient light that can be directed at angles near normal to the array of display elements and reflected by the display elements at angles near normal to the array (or otherwise within the desired field-of-view) can be increased. In various embodiments, the display elements comprise reflective display elements and in some embodiments, the display elements comprise reflective interferometric modulators.

Figure 1:
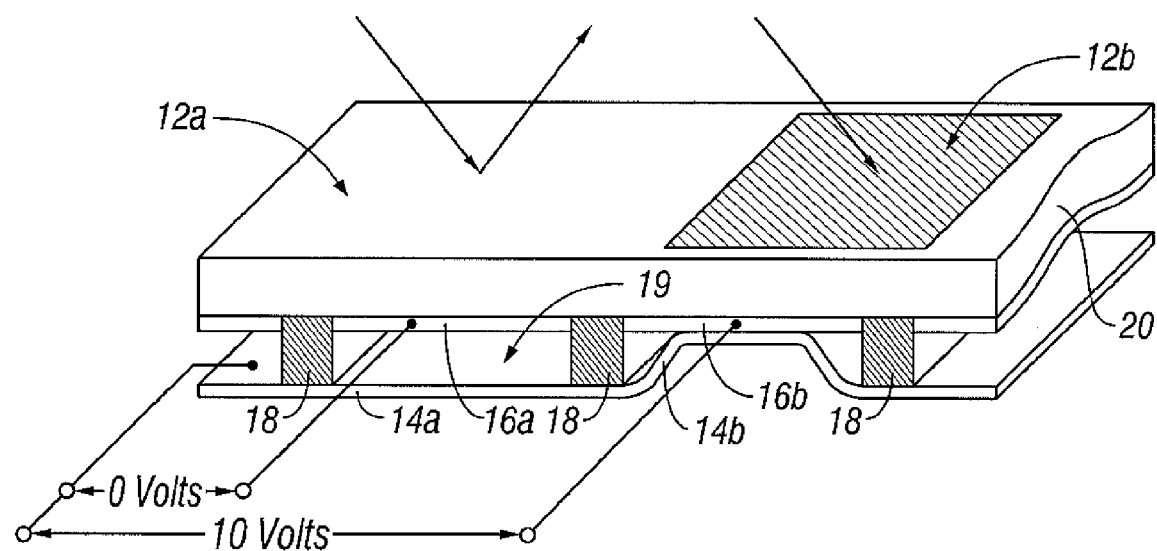
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("relaxed" or "open") state, the display element reflects a large portion of incident visible light to a user. When in the dark ("actuated" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) to form columns deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device. Note that FIG. 1 may not be to scale. In some embodiments, the spacing between posts 18 may be on the order of 10-100 um, while the gap 19 may be on the order of <1000 Angstroms.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential (voltage) difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by actuated pixel 12b on the right in FIG. 1. The behavior is the same regardless of the polarity of the applied potential difference.

FIGS. 2 through 5 illustrate one exemplary process and system for using an array of interferometric modulators in a display application.

Figure 2:
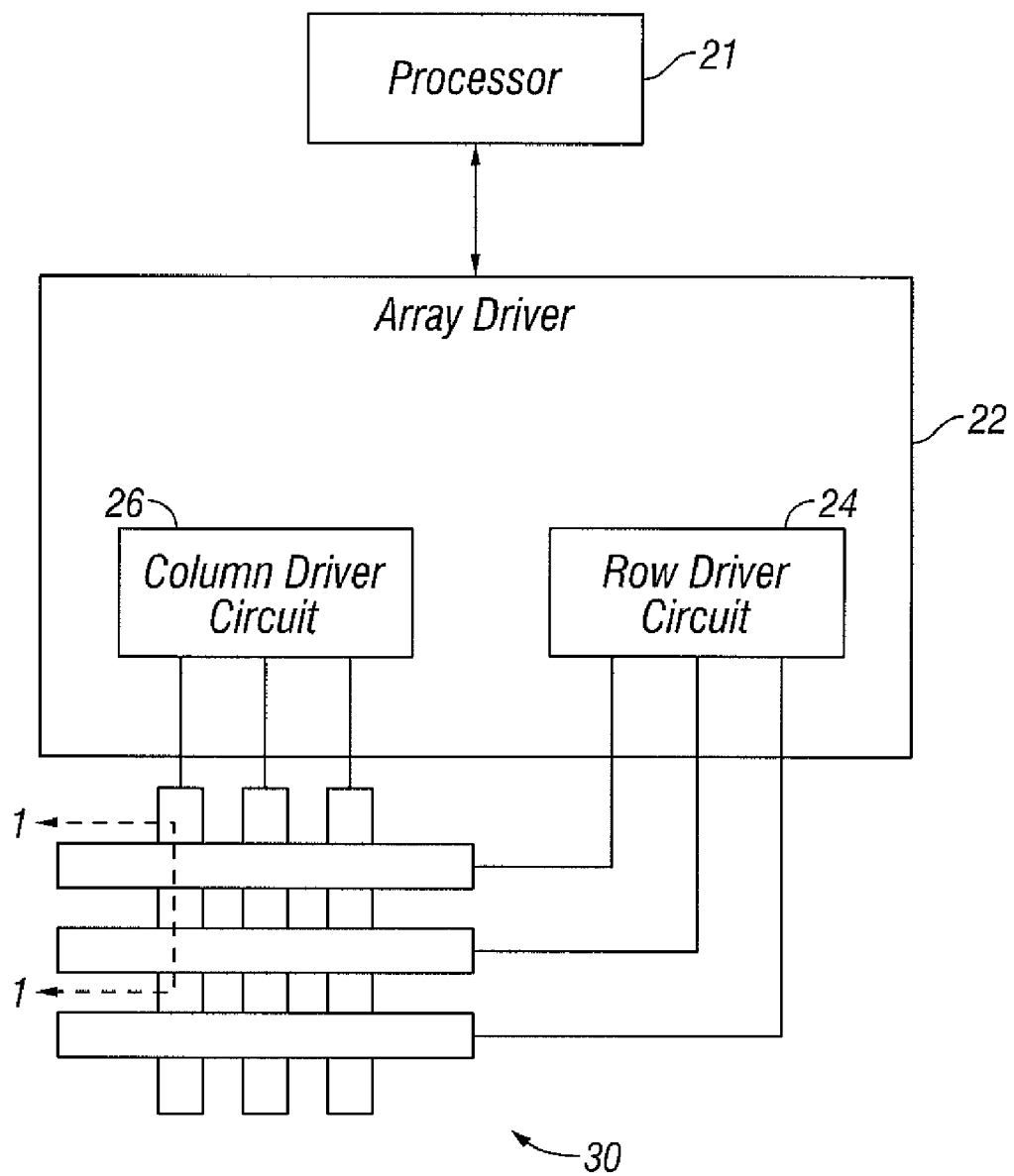
FIG. 2 is a system block diagram illustrating one embodiment of an electronic device incorporating a 3×3 interferometric modulator display.

FIG. 2 is a system block diagram illustrating one embodiment of an electronic device that may incorporate interferometric modulators. The electronic device includes a processor 21 which may be any general purpose single- or multi-chip microprocessor such as an ARM®, Pentium®, 8051, MIPS®, Power PC®, or ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. Note that although FIG. 2 illustrates a 3×3 array of interferometric modulators for the sake of clarity, the display array 30 may contain a very large number of interferometric modulators, and may have a different number of interferometric modulators in rows than in columns (e.g., 300 pixels per row by 190 pixels per column).

Figures 3, 4:
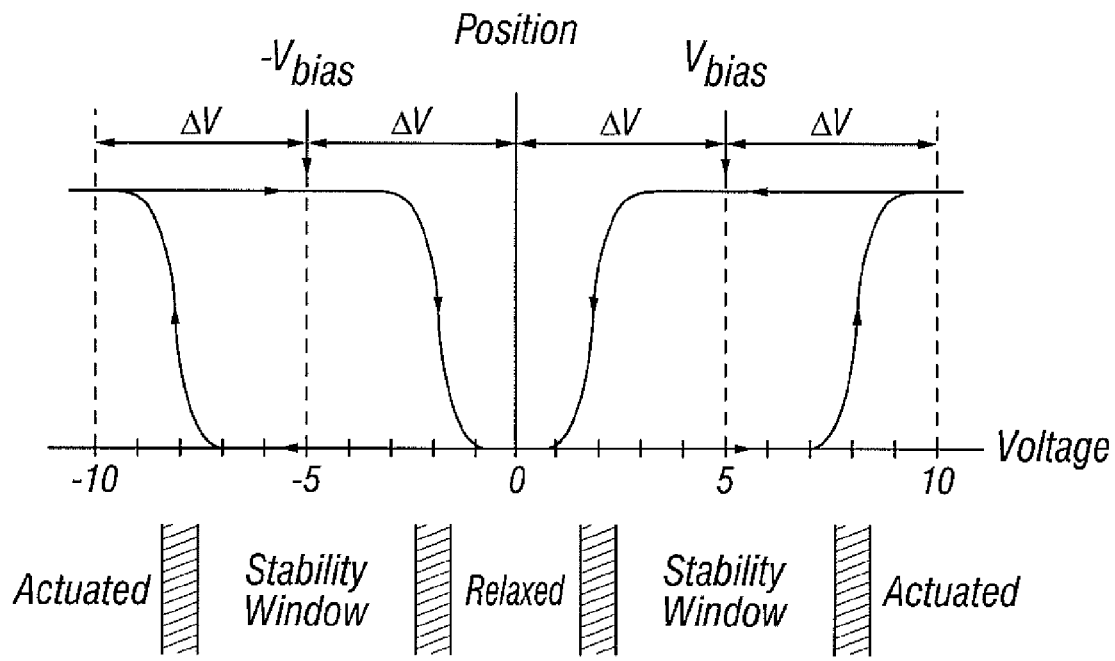
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIG. 3 is a diagram of movable mirror position versus applied voltage for one exemplary embodiment of an interferometric modulator of FIG. 1. For MEMS interferometric modulators, the row/column actuation protocol may take advantage of a hysteresis property of these devices as illustrated in FIG. 3. An interferometric modulator may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state or bias voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

As described further below, in typical applications, a frame of an image may be created by sending a set of data signals (each having a certain voltage level) across the set of column electrodes in accordance with the desired set of actuated pixels in the first row. A row pulse is then applied to a first row electrode, actuating the pixels corresponding to the set of data signals. The set of data signals is then changed to correspond to the desired set of actuated pixels in a second row. A pulse is then applied to the second row electrode, actuating the appropriate pixels in the second row in accordance with the data signals. The first row of pixels are unaffected by the second row pulse, and remain in the state they were set to during the first row pulse. This may be repeated for the entire series of rows in a sequential fashion to produce the frame. Generally, the frames are refreshed and/or updated with new image data by continually repeating this process at some desired number of frames per second. A wide variety of protocols for driving row and column electrodes of pixel arrays to produce image frames may be used.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
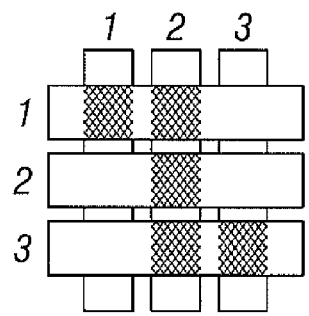
FIGS. 5A and 5B illustrate one exemplary timing diagram for row and column signals that may be used to write a frame of display data to the 3×3 interferometric modulator display of FIG. 2.
Figure 5B:
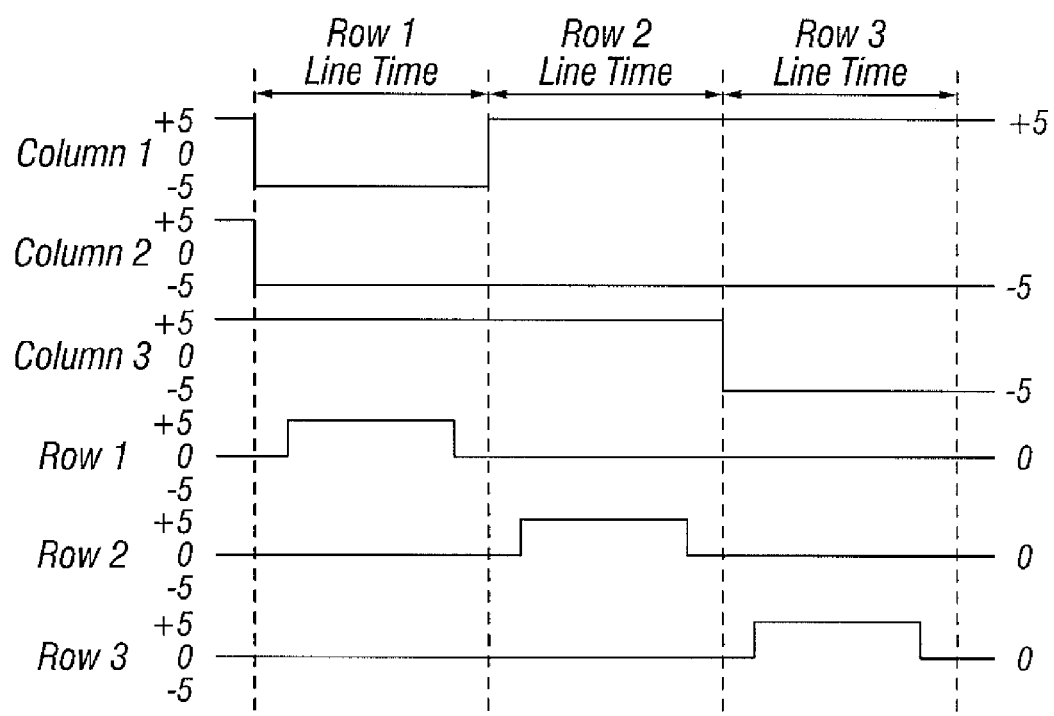

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are initially at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. The same procedure can be employed for arrays of dozens or hundreds of rows and columns. The timing, sequence, and levels of voltages used to perform row and column actuation can be varied widely within the general principles outlined above, and the above example is exemplary only, and any actuation voltage method can be used with the systems and methods described herein.

Figure 6A:
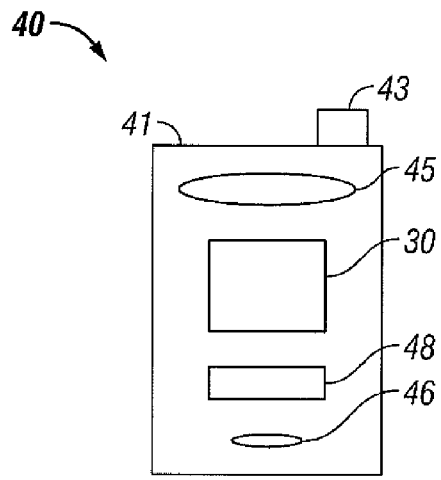
FIGS. 6A and 6B are system block diagrams illustrating an embodiment of a visual display device comprising a plurality of interferometric modulators.
Figure 6B:
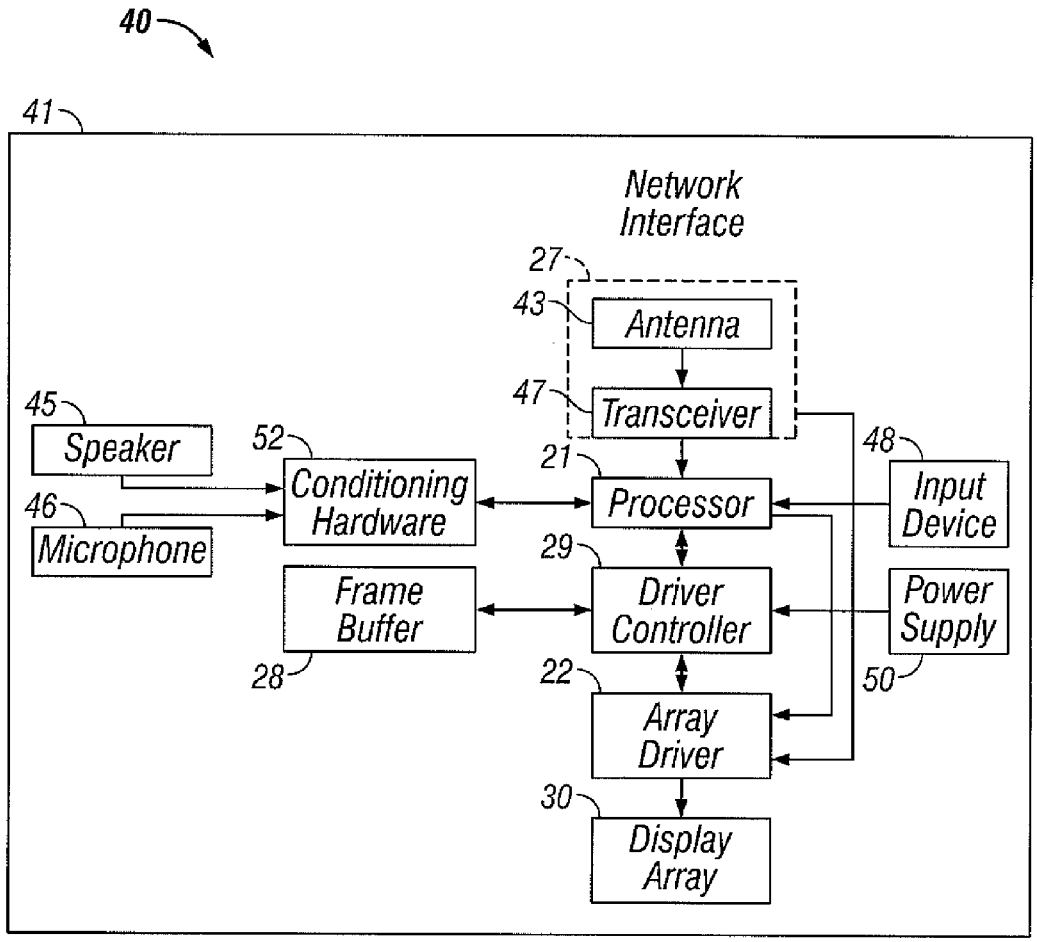

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30.

A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, W-CDMA, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. The above-described optimization may be implemented in any number of hardware and/or software components and in various configurations.

Figure 7A:
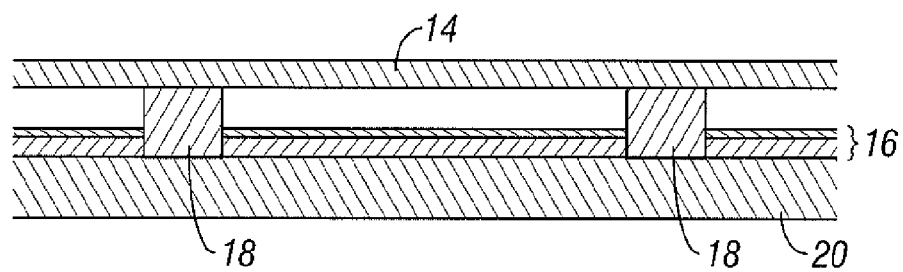
FIG. 7A is a cross section of the device of FIG. 1.
Figure 7B:
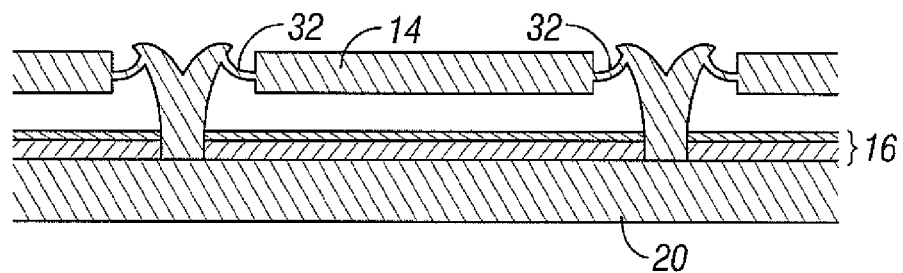
FIG. 7B is a cross section of an alternative embodiment of an interferometric modulator.
Figure 7C:
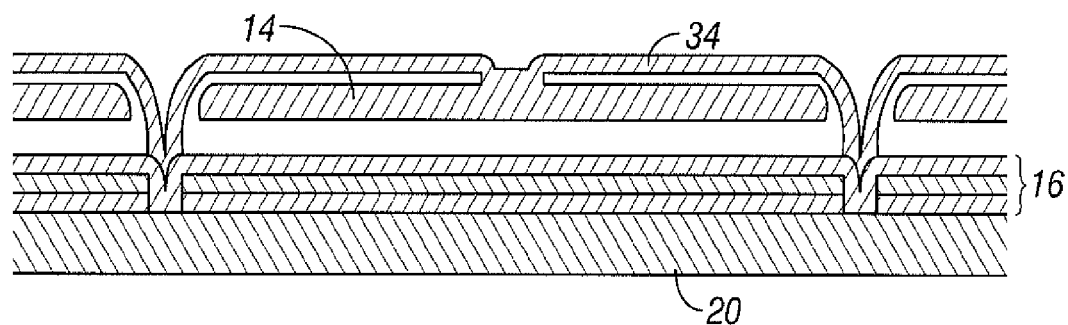
FIG. 7C is a cross section of another alternative embodiment of an interferometric modulator.
Figure 7D:
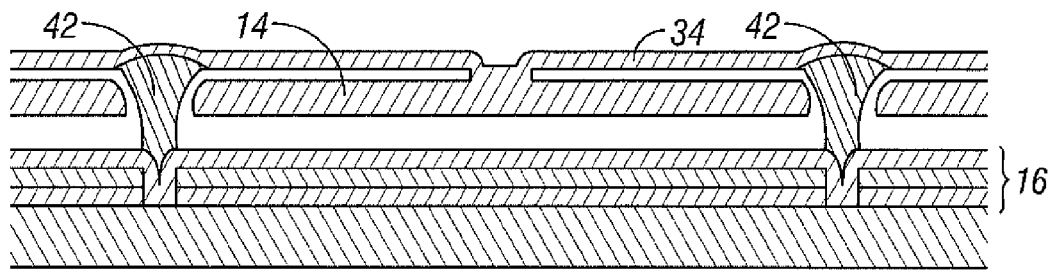
FIG. 7D is a cross section of yet another alternative embodiment of an interferometric modulator.
Figure 7E:
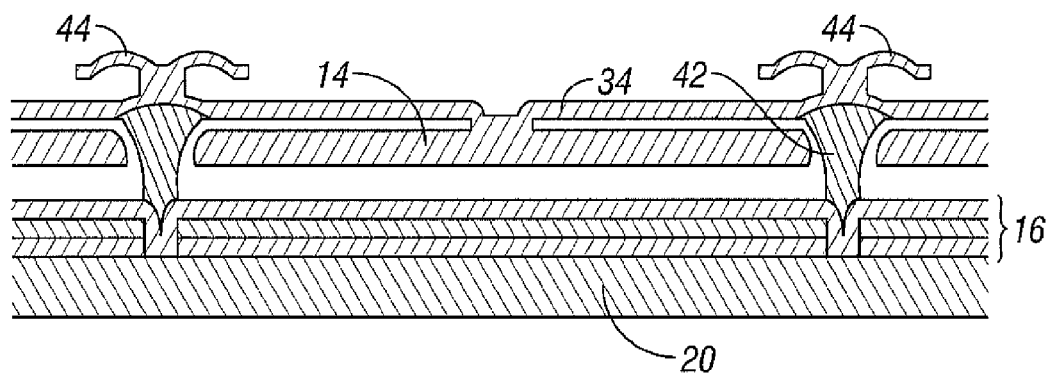
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 of each interferometric modulator is square or rectangular in shape and attached to supports at the corners only, on tethers 32. In FIG. 7C, the moveable reflective layer 14 is square or rectangular in shape and suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. For example, such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Various embodiments of the present invention relate to increasing the amount of light available to display elements of a display device. In certain embodiments, a display device comprises a plurality of reflective display elements having a preferred field-of-view from which a viewer will view image content displayed by the display elements. Improved brightness may be achieved in certain embodiments by increasing the amount of ambient light output by the display in within the field-of-view of the device.

In various embodiments described herein, display devices comprise a plurality of reflective display elements such as reflective spatial light modulators. Reflective interferometric modulators are examples of such reflective spatial light modulators. In certain embodiments, only light incident on the display device within the field-of-view of the display device is reflected within the field-of-view of the device. Accordingly, in such embodiments ambient illumination of the display device is generally limited to ambient light incident on the display device within the field-of-view of the device.

Figure 8A:
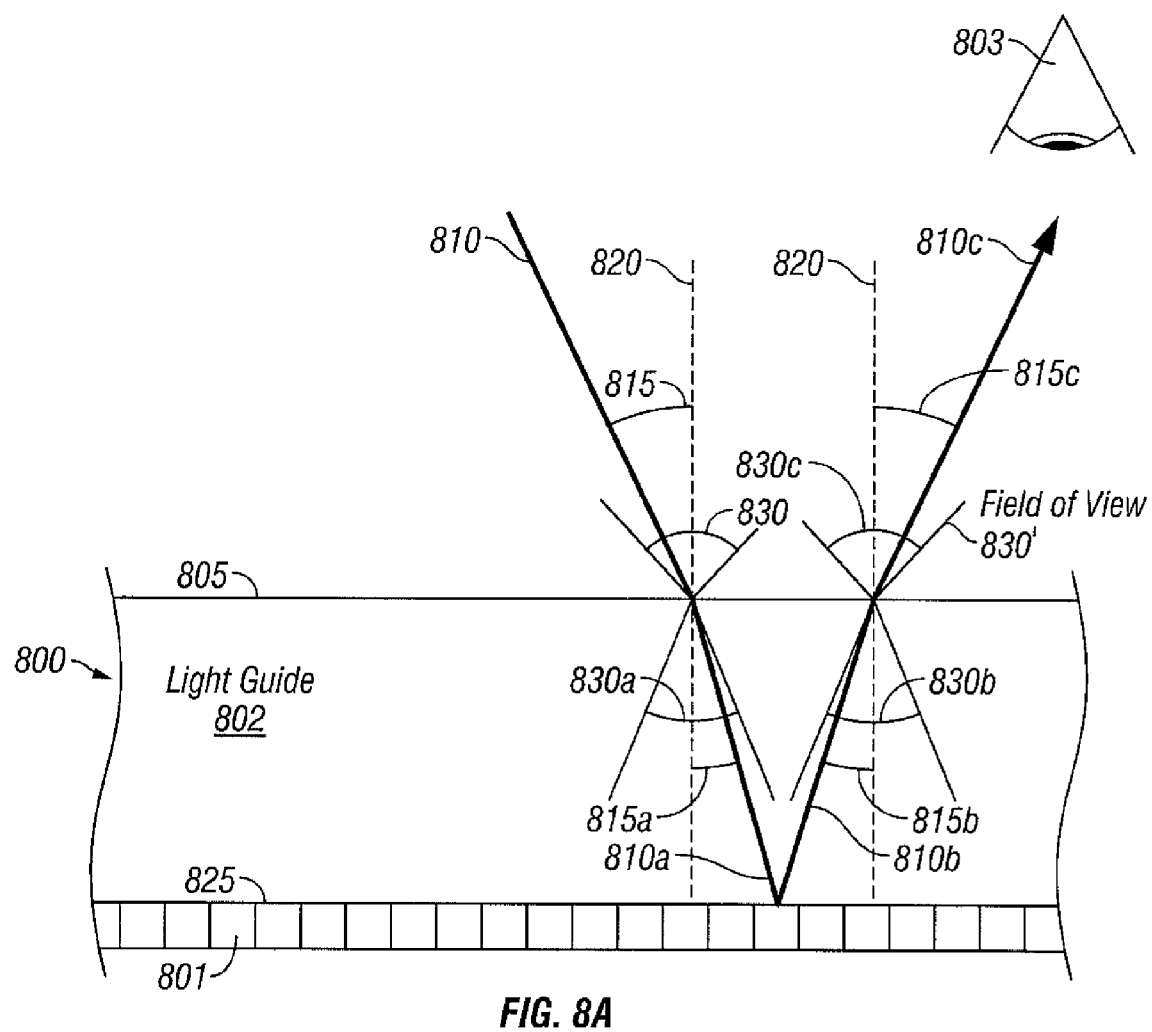
FIG. 8A schematically illustrates light incident on a display device within the field-of-view of the display device such that light is reflected therefrom to a viewer within the field-of-view of the display device.

FIG. 8A schematically illustrates the situation where light incident on a display device 800 having a field-of-view 830' is within the field-of-view of the display device and is reflected from the display device to a viewer 803 at an angle also within the field-of-view of the device. FIG. 8A shows a plurality of display elements 801 having a light guide 802 or other optically transmissive medium disposed forward (on the viewing side) of the display elements. Light is incident on the light guide 802 or optically transmissive medium at an angle within the field-of-view 830' of the display device.

Although the optically transmissive medium 802 is shown as a single layer, in other embodiments, the optically transmissive medium may comprises a plurality of layers. For example, one or more films or layers may form part of the light guide 802. Other embodiments may include additional layers in addition to the light guide 802. Alternatively, some embodiments may exclude the light guide 802. In such embodiments, the optically transmissive medium 802 disposed forward the display elements 801 may comprise, for example, one or more other optically transmissive layers such a substrate on which the display elements are formed, a protective glass or plastic plate or sheet, or one or more other optically transmissive films, layers, sheets, plates, etc. In other embodiments, a substrate on which the display elements are formed, a protective glass or plastic plate or sheet, etc. may also form part of the light guide 802.

In general, the optically transmissive medium 802 has a first surface 805 that defines an interface, which may be an interface between, for example, air (above or on the viewing side of the first surface 805) and the optically transmissive medium 801 (below or on a spatial modulator side of the first surface 805). Alternatively, the interface 805 may be between another medium above first surface 805 and the optically transmissive medium 801 below first surface 805. In some embodiments, the medium above the first surface 805 is not part of the display device 800, wherein in other embodiments, it is.

An incident light ray 810 can be characterized by a first incident angle 815 measured with respect to the normal 820 to the surface 805 and to the array of display elements 801. The incident light ray 810 is refracted at the surface 805 to produce a refracted light ray 810a characterized by a first transmission angle 815a. The refracted light ray 810a is reflected at a second surface 825 corresponding to the plurality of display elements 801 to produce a reflected light ray 810b. The reflected light ray 810b encounters the first surface 805 of the reflecting device at a second incident angle 815b. The reflected light ray 810b is again refracted and becomes an output light ray 810c, characterized by a second transmission angle 815c with respect to the normal 820.

A first angular range 830 corresponding to the field-of-view 830' of the device 800 is shown in FIG. 8A. A second angular range 830a corresponding to the effective field-of-view 830' within the optically transmissive medium 802 is also shown. The second angular range 830a is smaller than the first angular range 830 due to refraction within the optically transmissive medium. A third angular range 830b symmetrical or, in some embodiments, identical to the second angular range 830a is also shown displaced to where the ray 810b is incident on surface 805 and exits from the optically transmissive medium 802. A fourth angular range 830c symmetrical or, in some embodiments, identical to the first angular range 830 is also shown at the location where the ray 810b is incident on surface 805 and exits from the optically transmissive medium 802. This fourth angular range 830c corresponds to the field-of-view 830' of the device 800 and shows whether a given ray of light reflected from the display device is within the field-of-view 830' of the device. Similarly, these other angular ranges 830, 830a, 830b, correspond to the field-of-view 830' of the device 800 and are replicated at different locations (inside and outside of the optically transmissive medium 802) as a reference to show whether a given ray of light incident on, refracted by, or reflected from portions of the display device 800 is within the field-of-view 830' of the display device. In the embodiment shown in FIG. 8A, these angular ranges 830, 830a, 830b, 830c show whether the first incident angles 815, the first transmitted angles 815a, the second incident angles 815b and the second transmitted angles 815c will be viewable upon exiting the device 800. Thus, if a light ray, such as 810 which is within the first angular range 830, it can be expected that the transmitted light ray 810a, the reflected light ray 810b, and the output light ray 810c will be oriented at angles within the first angular range 830a, the second angular range 830b and the third angular range 830c, respectively.

In some instances, the second angular range 830a and the third angular range 830b include substantially the same range of angles. In some instances, the first angular range 830 and the fourth angular range 830c include substantially the same range of angles. In other instances, the second angular range 830a and the third angular 830b and/or the first angular range 830 and the fourth angular range 830c do not include substantially the same range of angles. For example, surface irregularities, tilted fields-of-view, and/or a plurality of display device components may contribute to such differences in the angular regions.

The field-of-view 830' and corresponding angular ranges 830, 830a, 830b, 830c may vary depending on, for example, the design of the device 800, materials used in the device, how a design is used, or external device properties. In some embodiments, one or both of the first angular range 830 and the fourth angular range 830c include a range of about 0° from the normal to about 60° or about 0° from the normal to about 180° from the normal. In some embodiments, one or both of the first angular range 830 and the fourth angular range 830c include a range of about 0° from the normal to about 60° or about 10° to about 60° from the normal (e.g., from about 0° or 10° from the normal to about 30°, to about 45°, or to about 60° depending, for example, on the usage model of the displays). The angular ranges can depend, for example, on factors, such as display size and viewing distance. In some embodiments, one or both of the second angular range 830a and the third angular range 830b include a range of about 0° from the normal to about 40° from the normal. In some embodiments, one or both of the second angular range 830a and the third angular region 830b include a range of about 0° from the normal to about 20° from the normal. In certain embodiments, the range of the second angular range 830a and/or the third angular range 830b may be less than the range of the first angular range 830 and the fourth angular region 830c, for example, as a result of refraction. In other embodiments, the range of the second angular range 830a and/or the third angular range 830b may be greater than the range of the first angular range 830 and the fourth angular region 830c depending on the index of refraction above and below the interface 805. The fourth angular range 830c may be approximately 1 to approximately 3 times as large as the second angular range 830a. For example, the fourth angular range 830c and the second angular range 830a may be about 80° and about 41°, respectively; about 60° and about 35°, respectively; about 40° and about 20°, respectively; about 20° and about 13°, respectively; or about 10° and about 7°, respectively, in some embodiments.

Figure 8B:
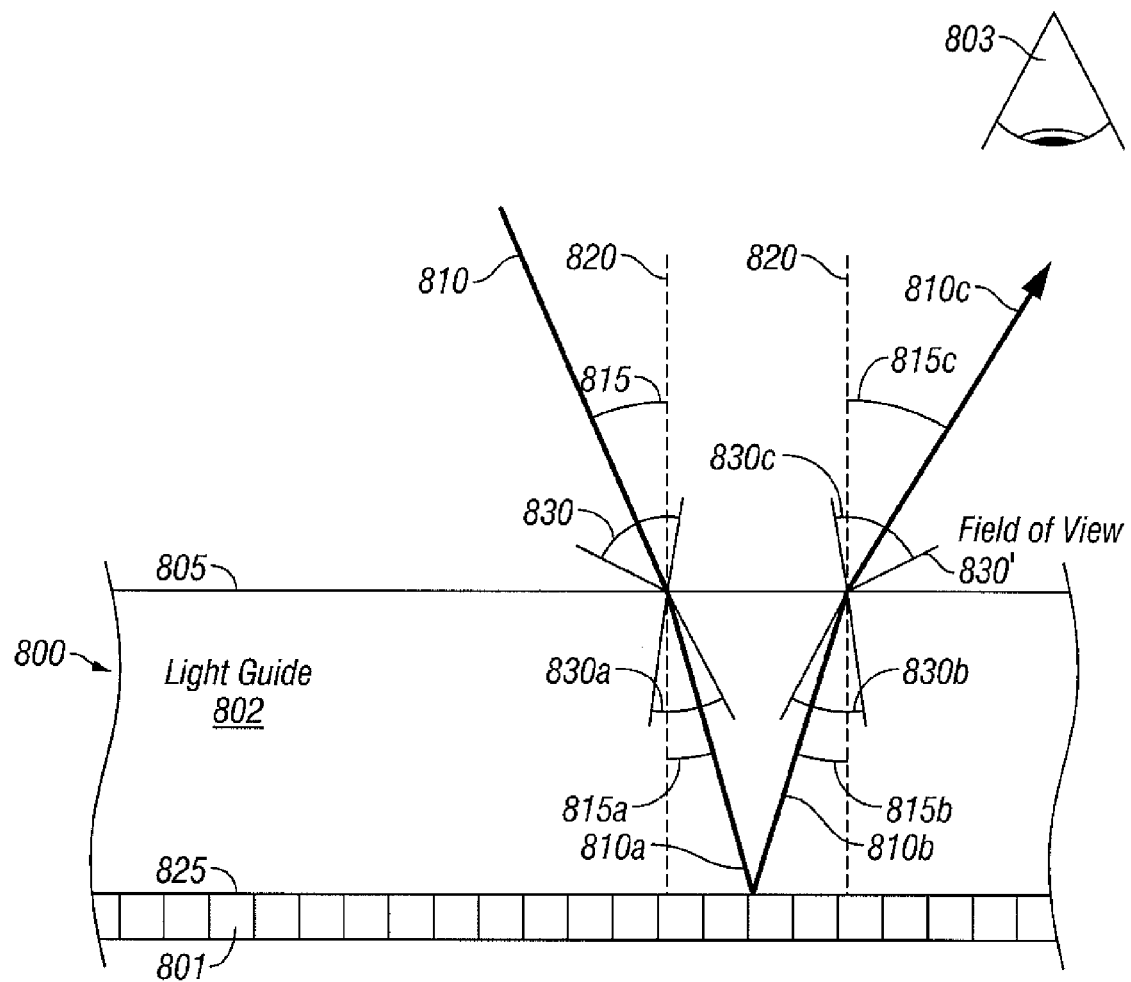
FIG. 8B schematically illustrates a display device comprising an array of display elements and having a field-of-view that is tilted with respect to the array of display elements.

FIG. 8B shows an embodiment wherein the field-of-view 830' is tilted and not centered or symmetrical about the normal 820. Similarly, angular ranges 830, 830a, 830b and 830c are not centered or symmetrical about the normal 820. Non-symmetric field-of-views 830' may be applicable, for example, to display devices 800 for viewing at a tilted angle. It will be understood that embodiments herein are not limited to symmetric viewing cones centered about the normal 820. The second angular range 830a may be mirror images of the third angular range 830b. (For example, if third angular range 830b includes angles between −35° and 45°, second angular range 830a could include angles between −45° and 35°.) Similarly, the first angular range 830 may include angles that are substantially mirror images of the fourth angular range 830d. In other embodiments, however, these angular ranges 830, 830a, 830b, 830c need not be mirror images.

FIG. 8C schematically illustrates the situation where light incident on a display device 800 outside the field-of-view 830' of the display device and is reflected from the display device at an angle also outside the field-of-view of the device. Light ray 810, for example, is shown incident on the light guide 802 or optically transmissive medium at an angle outside the field-of-view 830' of the display device.

FIG. 8C also shows four corresponding angular regions 835, 835a, 835b and 835c outside the field-of-view 830'. A first angular region 835, a second angular region 835a, a third angular region 835b, and a fourth angular region 835c indicate ranges of the first incident angles 815, the first transmitted angles 815a, the second incident angles 815b and the second transmitted angles 815c, for which light will not be within the field-of-view 830' upon exiting the device. Thus, if a light ray such as 810 is within the first angular region 835, it can be expected that the transmitted light ray 810a, the reflected light ray 810b, and the output light ray 810c will be characterized by angles within the second angular region 835a, the third angular region 835b and the fourth angular region 835c, respectively and not within the field-of-view 830'.

Further, FIG. 8C shows first and second forbidden angular regions 840a, 840b. Light from above the interface 805 will not be refracted into these forbidden angular regions 840a, 840b if the index of refraction above the interface is less than the index of refraction below the interface. For example, even if incident light ray 810 encountered the surface 805 at the largest angle possible, refraction would prevent the light from entering the first device angular region 840a and therefore from being reflected into the second device angular region 840b. Typically, the angles within the angular regions 835, 835a, 835b and 835c outside the field-of-view will be larger than angles within the angular regions 830, 830a, 830b and 830c corresponding to the field-of-view 830' of the device 800, and the angles within the forbidden angular regions 840a and 840b will be larger than angles within the angular regions 835a and 835b outside the field-of-view 830' of the device.

Figure 8D:
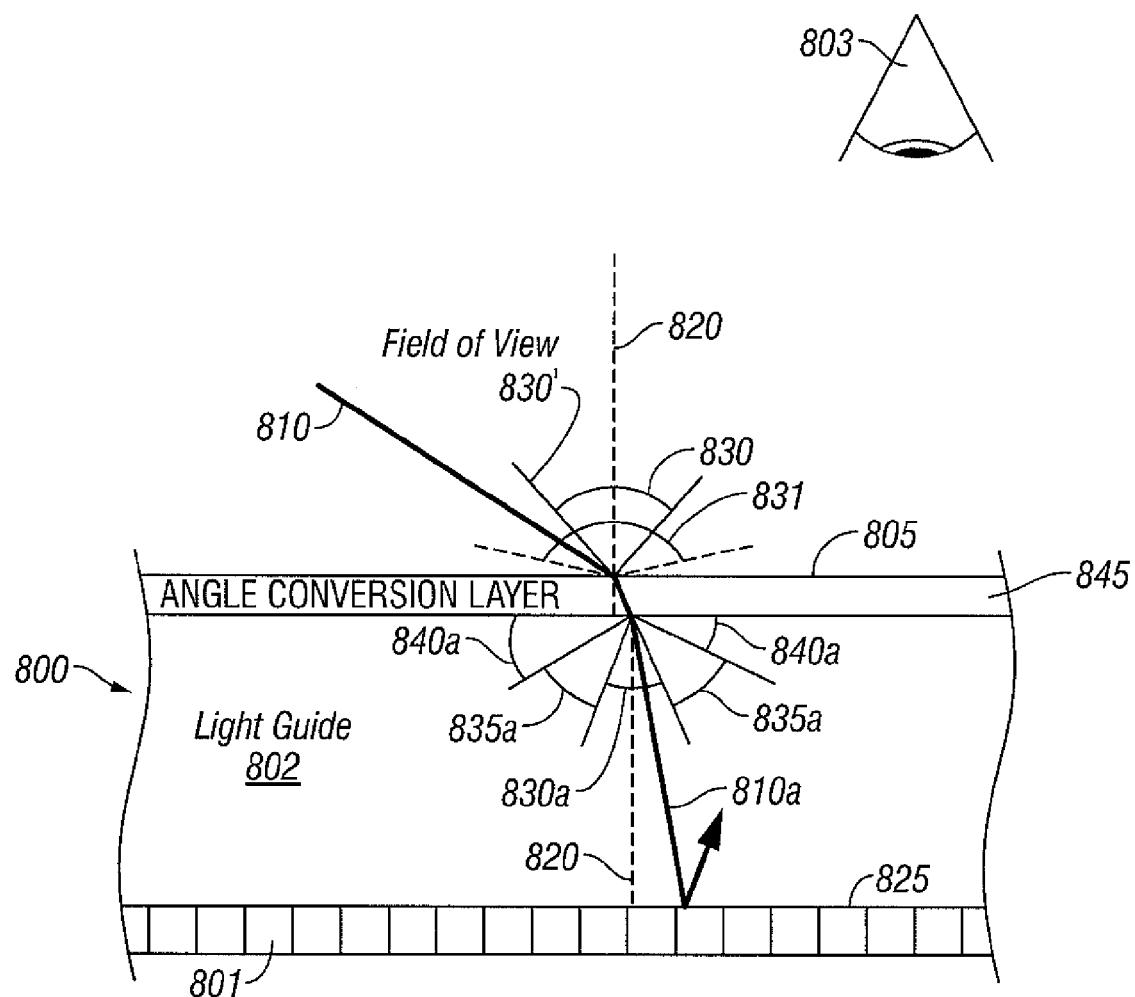
FIG. 8D schematically illustrates a display device having an angular conversion layer disposed forward an array of display elements that redirects light incident on the display device at an angle outside the field-of-view into an angle more normal to the array of display elements and within the field-of-view of the display device.

In order to, for example, enhance the brightness of the display device 800, it can be advantageous to redirect light incident on the display device outside the field-of-view (e.g., in first angular region 835) into the field-of-view 830' (e.g., into second angular region 830a, third angular region 830b, and fourth angular region 830c). Therefore, more incident (e.g., ambient) light can directed to the viewer 803 upon reflection from of the plurality of display elements 801. FIG. 8D shows a strategy to increase the amount of ambient light collected using an angle converting device 845, such as a diffractive layer. The angle converting device 845 re-directs light outside the field-of-view 830' by changing the direction of the transmitted light rays towards the surface normal 820 (e.g., by reflective or transmissive diffraction). In some embodiments, an index of refraction of the angle conversion layer 845 comprises a holographic or diffractive layer. Thus, at least some of the incident light (e.g., light ray 810) that would have been within the first angular region 835a outside the effective field-of-view is re-directed, such that the transmitted light (e.g., transmitted light ray 810b) is within the first angular 830a inside the effective field-of-view. This light is reflected from the array of display elements 801 into the third angular region 830b and output into the fourth angular region 830c within the field-of-view 830' of the display device 800. This light is therefore directed to a viewer 803. In essence, the first angular range 830 is redefined as a larger angular region 831. More light can be collected and directed into the field-of-view 830', 831 and be used to convey image content to the viewer 803. The display device is thus brighter.

Figure 8E:
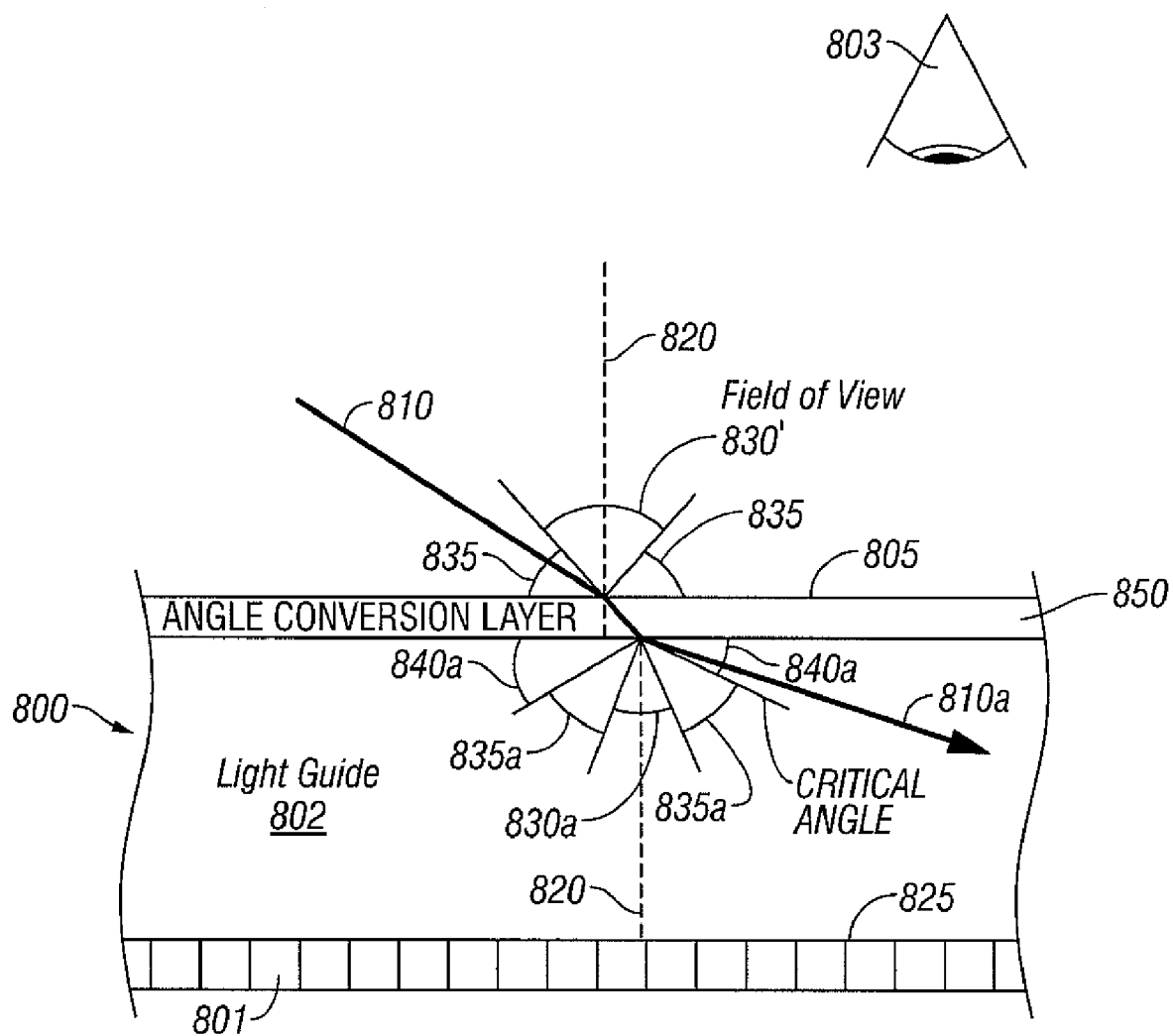
FIG. 8E schematically illustrates a display device having an angular conversion layer forward a plurality of display elements that redirects light incident on the display device at an angle outside the field-of-view into a larger (more grazing incidence) angle such that the light is guided in a light guide forward the array of display elements.

As illustrated in FIG. 8E, various embodiments of the present invention include an angle converting device 850 that re-directs light by changing the direction of the transmitted light rays away from the surface normal 820. The angle converting device 850 may therefore increase the angle of the transmitted ray 810a as measured with respect to the normal 820. For example, the angle converting device 850 receives light ray 810 and transmits light ray 810a to be within the first forbidden angular region 840a. Thus, in some instances, the light is re-directed to an angle greater than a critical angle, such as for example the critical angle associated with the boundaries of the light guide 802. This light is therefore coupled into the light guide 802 so as to be guided therein by total internal reflection. The light is optically guided in the light guide 802 via total internal reflection in a customary manner for waveguides. In certain embodiments, turning features are included to eject light from the light guide 802 at near normal angles. This light then reflects from the array of display elements 801 through the light guide 802 at near normal angles and out of the display device 800 within the field-of-view 830' to a viewer 803.

Figure 9:
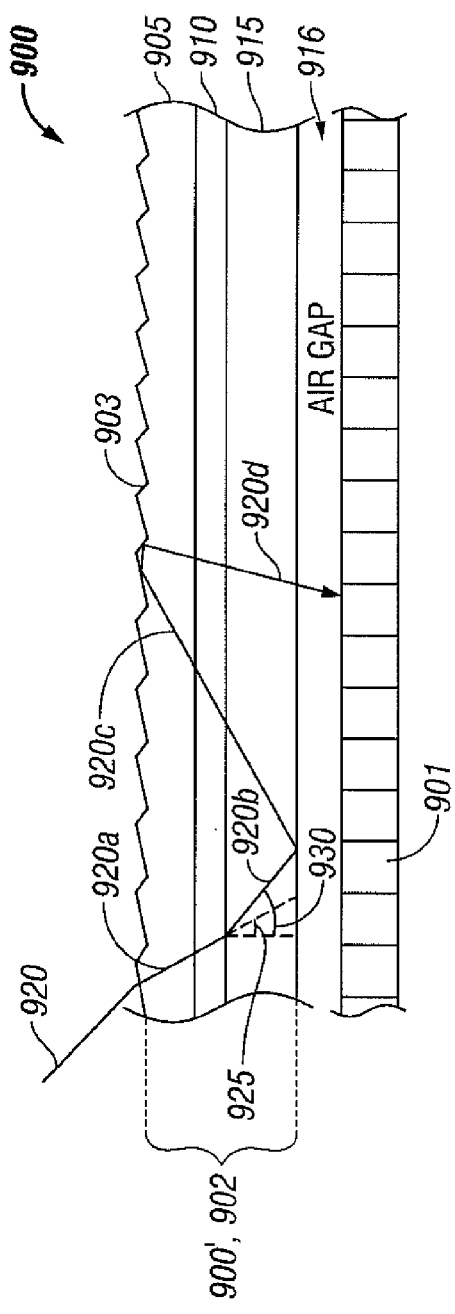
FIG. 9 schematically illustrates an illumination apparatus comprising a light guide forward an array of display elements, diffractive microstructure that couples light incident on the display device at an angle outside the field-of-view into so as to be guided in the light guide, and light turning features that redirect the light guided by the light guide onto the array of display elements at near normal incidence.

FIG. 9 shows an embodiment of a display device 900 comprising an illumination apparatus 900' and a plurality of display elements 901 such as intereferometric modulators. The illumination apparatus 900' is forward of the plurality of display elements 901 and assists in front illumination thereof. The illumination apparatus 900' of the display device 900 may include a light guide or light guide region 902 that guides light propagating therein (e.g., light ray 920) at an angle greater than a critical angle for the light guide. The light 920 is ejected from the light guide 902, for example, to provide illumination of the array of display elements 901 rearward of the light guide. The light guide 902 may comprise one or more layers and/or components. These layers may comprise glass or polymeric material or other substantially optically transparent material. In some embodiments the light guide 902 comprises one or more of glass, polycarbonate, polyether or polyester such as, e.g., PET, acrylic or acrylate and acrylate polymers and copolymers including but not limited to polymethymethacrylate (PMMA)), styrene-acrylic copolymer, and poly(styrene-methylmethacrylate) (PS-PMMA), sold under the name of Zylar, and other optically transmissive plastics although other materials may also be used. In some embodiments the light guide region 902 has a thickness in the range of between about 100 μm and about 1 cm, e.g. between 0.1 mm and 0.4 mm, although the thickness may be larger or smaller. In some embodiments, the light guide region 902 has a thickness of less than about 400 μm, such as, for examples, embodiments in which the light guide does not include a substrate. In some embodiments, the substrate is part of the light guide region 902 and thus the thickness of the light guide region 902 may be larger, such as about 100 μm to about 1 cm.

The light guide region 902 may include a substrate 915 in certain embodiments. This substrate 915 may comprise substantially optically transmissive material such as for example glass or plastic or other materials. As described above, the material may comprise aluminum silicate or borosilicate glasses although other materials may also be used. For example polycarbonate, polyether and polyesters such as, e.g., PET or PEN, acrylics or acylates and acrylate polymers and copolymers including but not limited to PMMA, poly(styrene-methylmethacrylate) (PS-PMMA) sold under the name of Zylar, and other optically transmissive plastics may be used. The materials that may be employed, however, are not limited to those specifically recited herein. The substrate 915 may have a thickness between about 0.1 mm and about 1 cm, (e.g. between 0.1 mm and 0.4 mm), although the thickness may be larger or smaller. In some embodiments, the substrate 915 may have a thickness sufficient to support other layers or films thereon.

The illumination apparatus 900' may also include light-turning features 903. A light-turning layer 905 may comprise a plurality of light-turning features 903. The light-turning features 903 may include, for example, prismatic and/or diffractive features. The light-turning features 903 may be shaped and/or oriented to turn light such that light guided within the light guide 902 is directed out of the light guide. Additionally, light-turning features 903 may be shaped and/or oriented such that the angle as measured with respect to the normal 920 to the light guide 902 and/or array of display elements 901 of the turned light is reduced and is therefore more normal, for example, as compared to light prior to interacting with the turning features. In some embodiments, the light-turning features 903 may be shaped and/or oriented to increase the amount of light within the field-of-view of the display device 900 and/or to increase the percentage of incident and/or ambient light that is output into the field-of-view of the display device. Alternatively, the light-turning features 903 may be shaped and/or oriented to reduce the angular size of the field-of-view of the display device 900. For example, the light-turning features 903 may assist in concentrating light output or reflected from display device 900 into a smaller angular region.

In FIG. 9, the light-turning features are shown as arranged on a layer. This layer forms an upper portion, and in particular, an upper boundary of the light guide 902. The light-turning features 903 need not be disposed at an upper portion of the light-guide 902 but may be located elsewhere, for example, in the middle or low portions of the light guide closer to the display elements 901. In some embodiments, the light-turning features 903 need not be included in a single layer.

In some embodiments the light-turning features 903 are reflective. Light guided within the light guide region 902 may be turned upon reflecting from such light-tuning features 903.

In one example, the light-turning features 903 comprise prismatic features. Such prismatic features may reflect light off of multiple facets via total internal reflection. FIG. 9 shows an example of such facets that form prismatic features. These prismatic features may be disposed in a film. This film may be substantially optically transmissive. In some embodiments, this film comprises a polymeric material such as, e.g., PC, PET, or PMMA, although other materials may also be used. In some embodiments, the film comprises a UV-curable resins molded on a plastic carrier film, such as, e.g., PC, PET or PMMA. Accordingly, the film may comprise polymeric material such as an optically transmissive material including but not limited to polycarbonate, acrylics or acrylates and acrylate polymers and copolymers including but not limited poly(styrene-methylmethacrylate) (PS-PMMA), sold under the name of Zylar, and other optically transmissive plastics. The materials that may be employed, however, are not limited to those specifically recited herein. This film may be between about 50 µm and about 500 µm (e.g. 100 µm and about 500 µm) thick or may have a thickness outside this range. In some embodiments the light turning features are between about 1 µm and about 50 µm deep and in some embodiments may be between about 0.5 and 50 µm wide although the light turning features may have other sizes in other embodiments. These features 903 have been exaggerated in size in FIG. 9 for illustrative purposes. Likewise the size, shape, arrangement, and other characteristics may be different. Moreover, the light-turning features 903 may comprise different structures in other embodiments.

The illumination apparatus 900 may also include diffractive microstructure, which may be included in a diffractive layer 910. This diffractive layer 910 may comprise one or more diffractive or holographic layers that provide the angle conversion as described above with respect to FIG. 8 (e.g. FIG. 8E). The diffractive microstructures may comprise surface and/or volume features that form, for example, one or more surface and/or volume diffractive optical elements or holograms. Such a diffractive layer 910 may be transmissive in certain embodiments and may operate on light transmitted therethrough. The diffractive layer 910 may operate on light incident thereon from forward of the display device 900 and may be customized to operate on light incident from a particular angle or set of angles such as ambient light incident on the illumination apparatus 900' at large angles with respect to the normal. As described above, this light may be incident on the illumination apparatus 900' and diffractive layer 910 at angles outside the field-of-view of the device 900.

The diffractive layer 910 may comprise, for example, holographic recording films or coatings, such as mixtures of acrylates and vinyl copolymers, or other photopolymers. The diffractive layer may include a holographic material such as, for example, a silver halide material, a dichromated gelatin material, a photoresist material, and/or a photorefractive crystal. Other materials may include those described in, for example, J. E. Boyd et al., Applied Optics. vol 39, iss. 14, p. 2353-2358 (10 May 2000), references cited therein, and/or www.hololight.net/materials.html. In various embodiments wherein the diffractive features 910 are surface features, the diffractive layer 910 may further comprise a planarized layer and/or a coating positioned over or under the diffractive microstructure. The planaraization layer may comprise a wet-coated polymeric coating or a spin-on glass in certain embodiments although the material need not be limited to such material. The diffractive layer 910 may be of any suitable thickness, such as, for example, between about 10 and about 100 microns although values outside this range are possible as well.

The diffractive microstructure and/or the diffractive layer 910 may be located below or rearward of the light-turning features 902 and/or light-turning layer 905 with respect to incident light on the display device 900. Thus, ambient light may be transmitted through the light-turning features 902 prior to being received by the diffractive microstructure. The diffractive microstructure and/or the diffractive layer 910 may be configured to receive light at a first angle smaller than a critical angle for the light guide 902 and to diffract the light to produce diffracted light at a second larger angle. The first and second angles may be measured with respect to the normal. The second larger angle may be greater than the critical angle of the light guide 902 such that the light is coupled into the light guide so as to be propagated therein by total internal reflection. In some embodiments, the refractive index of the light-turning layer 905 is similar to or the same as the index of refraction of the diffractive layer 910. Reflection of light passing through the interface between the light-turning layer 905 and the diffractive layer 910 can thereby be reduced. In other embodiments the refractive index of the diffractive layer 910 is lower than or higher (which, in some embodiments, is advantageous over "lower") than that of the light-turning layer 905. The light-turning features 902 may be configured such that light traveling from the diffractive layer 910 to the light-turning features 902 is turned to be directed out of the light guide 902 and/or to reduce the angle with respect to the normal to the illumination apparatus 900' or display device 900.

As described above, in some embodiments, the illumination apparatus 900 includes a substrate 915. This substrate 915 may provide support for the diffractive layer 910 and/or the light-turning layer, for example during fabrication or use. The diffractive layer 910 and/or the light-turning layer 905 may be formed over, for example, deposited on or applied (e.g., laminated) to the substrate 915 or one or more layers formed on the substrate. In some embodiments, the diffractive layer 910 may be formed over, for example, deposited on or applied (e.g., laminated) to the substrate 915 or one or more layers formed thereon and the light-turning layer 905 may be formed over, for example, deposited on or applied (e.g., laminated) to the diffractive layer 910 or one or more layers formed thereon. Accordingly, in some embodiments the substrate 915 may be located beneath the diffractive microstructure and/or the diffractive layer 910 with respect to incident light. In other embodiments, the diffractive microstructure and/or the diffractive layer 910 is formed below or rearward of the substrate 915. In other embodiments, the illumination apparatus 900 does not include a substrate 915.

In some embodiments the substrate 915 forms part of the light guide 902. In the embodiment shown in FIG. 9, the critical angle for the lower or rearward boundary of the light guide 902 is determined by the interface of the substrate 915 and an optical medium rearward of the substrate 915. In the embodiment shown in FIG. 9, an air gap 916 is disposed rearward of the substrate and illumination apparatus 900' and forward of one or more or an array of display elements 901. The interface between the substrate 915 and the air gap in this embodiment determines the critical angle for reflection from the lower or rearward boundary of the light guide 902.

In other embodiments, this gap 916 may be filled with material. Likewise, in certain embodiments, one or more layers may be attached to the substrate 915 rearward of the substrate and form port of the light guide 902. These layers may or may not be part of the light guide region 902 depending, for example, on the index of refraction of these layers.

In the embodiment shown in FIG. 9, the critical angle for the upper or forward boundary of the light guide 902 is determined by the interface of the light-turning layer 905 and an optical medium forward of the light-turning 905 or illumination apparatus 900'. In the embodiment shown in FIG. 9, an air layer is disposed rearward of the substrate and illumination apparatus 900' and forward of an array of display elements 901. The interface between the light-turning film 905 and the air in this embodiment determines the critical angle for reflection from the upper or forward boundary of the light guide 902.

In other embodiments, the light-turning layer 905 is not the uppermost or forwardmost layer. In such embodiments, one or more layers forward the light-turning layer 905 may determine the critical angle for the upper or forward boundary of the light guide 902 depending on index of refraction. Likewise, in certain embodiments, one or more layers may be attached to the light turning layer forward of the light-turning layer 905 and form part of the light guide 902 or define a boundary of the light guide 902. A planarization layer may be disposed on the light-turning layer 905. The layer or layers forward the light-turning layer 905 may or may not be part of the light guide region 902 depending, for example, on the respective indices of refraction.

More generally, the critical angle for the upper or forward boundary of the light guide 902 may be determined by the interface of the forward most layer of the light guide 900 and the optical medium directly forward of the forwardmost layer. The critical angle for the lower or rearward boundary of the light guide 902 may be determined by the interface of the rearwardmost layer of the light guide 900 and the optical medium directly rearward of the rearwardmost layer.

In some embodiments, an isolation layer is disposed between the light guide region 902 and the plurality of display elements 901. This isolation layer, for example, may comprise a material having an index of refraction lower than the light guide 902. In the absence of the air gap 916 or isolation layer, the light guide 902 may be disposed directly on the array of display elements 901. In such a configuration, light guided within the light guide 902 may be incident on the array of display elements 901 may be absorbed.

FIG. 9 shows an example trajectory of a ray of light 920 through the illumination apparatus 900. The light ray 920 enters the illumination apparatus 900 at the top surface of the light-turning layer 905. Due to a difference in refractive indices, the light beam 920 is refracted as shown by transmitted light ray 920a. In this example, the light ray 920a is transmitted through the light-turning layer 905 into the diffractive layer 910. The diffractive layer 910 diffracts and re-directs of the light ray 920a, producing a diffracted light ray 920b directed at an angle 930 from the normal to the display apparatus 900' and one or more or an array of display elements 901. This angle 930 is larger than the angle 925 of an undiffracted ray that would result in the absence of the diffractive layer 925.

The diffracted light beam 920b is totally internally reflected at the interface between the substrate 915 and the air gap 916 to produce the reflected light beam 920c. The reflected light beam 920c travels through the diffractive layer 910 into the light-turning layer 905. The light-turning features 902 then turn the light, such that the turned light beam 920d has a reduced angle with respect to the normal as compared to the angle with respect to the normal of the reflected light beam 920c. The turned light beam 920d is then transmitted through the diffractive layer 910 and the substrate 915 to exit the illumination apparatus 900 and is incident on the array of display elements 901. Although not shown, the turned light beam 920d may be reflected from the array of display element 901 depending, for example, on the state of the reflective light modulators. Accordingly, the turned light beam 920d may be directed out of the display device toward a viewer in a direction near normal to the array of display element 901 and within the field-of-view of the display device 900. Thus, the diffractive layer 910 redirects light from a first set of angles into a second set of angles and thereby enables ambient light directed into a light guide region to be redirected into an angle that is guided by the light guide region and otherwise forbidden from being directly accessed by ambient light.

Figure 10:
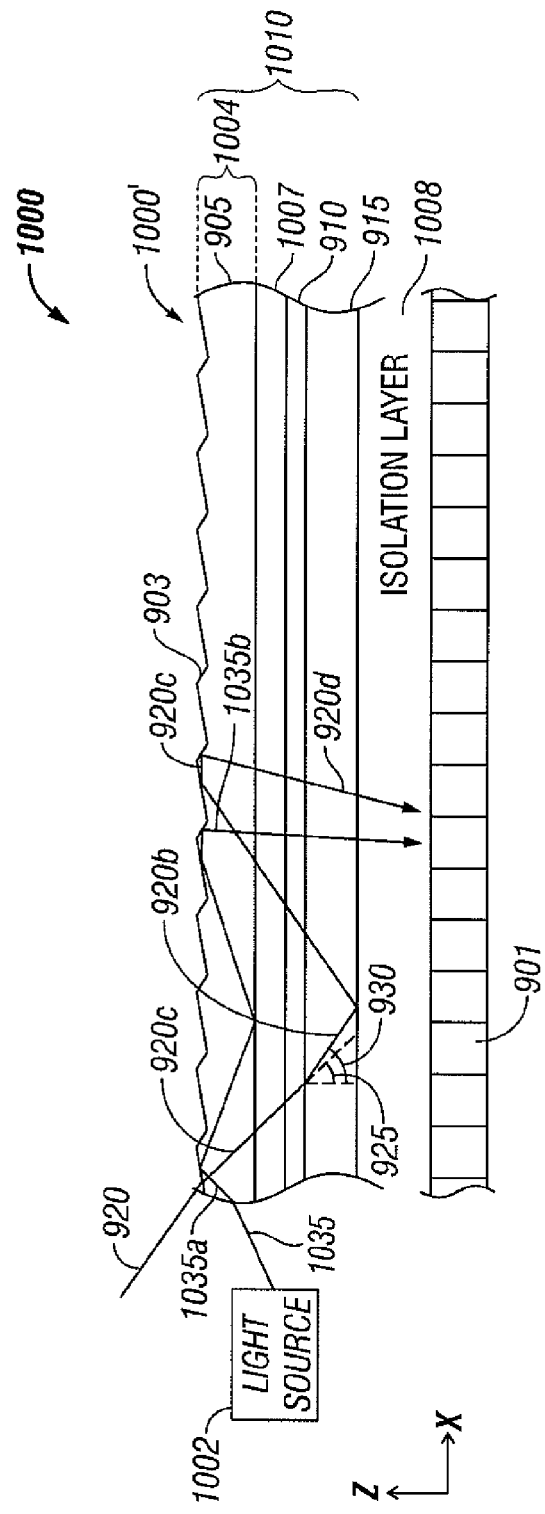
FIG. 10 schematically illustrates an illumination apparatus further comprising an artificial light source such as an light emitting diode or a light bar for providing supplemental illumination.

FIG. 10 shows a display device 1000 comprising an illumination apparatus 1000' in which the diffractive layer 910 is separated from the light-turning layer 905. One or more separation layers 1007 may separate the diffractive layer 910 and the light-turning layer 905. The one or more separation layers 1007 is substantially optically transmissive and may be diffusive in some embodiments. The one or more separation layers 1007 may have a refractive index lower than that of the light-turning layer 905 such that the light-turning layer 905 can guide light therein. The one or more separation layers 1007 may have a refractive index greater than that of the diffraction layer 910.

The one or more separation layers 1007 may material selected from the group of acrylics, polyesters, polyethers, or cycloolefin polymers. In some embodiments, for example, the separation layers 1007 may comprise an optically transmissive material such as, e.g., polycarbonate, acrylics or acrylates and acrylate polymers and copolymers including but not limited polymethymethacrylate (PMMA), poly(styrene-methylmethacrylate) (PS-PMMA), sold under the name of Zylar, and other optically transmissive plastics. In some embodiments, the one or more separation layers 1007 may comprise a pressure sensitive adhesive. The one or more separation layers 1007 may be of any suitable thickness, such as, for example, between about 1 to about 100 microns (e.g., between about 1 and 30 microns) although values outside this range are also possible.

The embodiment shown in FIG. 10 also includes a light source 1002 that provides light to the illumination apparatus 1000. The light source 1002 may comprise an edge light source, located adjacent to the illumination apparatus 1000 so as to inject light into an edge thereof. The light source 1002 may comprise for example one or more light emitters such as LED and may comprise, for example, a linear array of LEDs. In certain embodiments, the light source 1002 may also comprise a light bar and one or more emitters disposed to inject light into the light bar.

The separation layer 1007 forms a light guiding region 1004 for the light emitted from the light source 1002. This light guiding region 1004 may comprise, for example, the light-turning layer. Light 1035 from the light source 1002 may enter the light-turning layer 905 as represented by a first light ray 1035a and may be guided by totally internally reflection within the light-turning layer 905, until a light-turning feature 902 turns the first light ray 1035a. An example turned light beam 1035b is shown directed to the array of display elements 901.

The separation layer 1007 forms a boundary for the light guiding region 1004 for the light emitted from the light source 1002. In the embodiment shown in FIG. 10, the separation layer 1007 optically decouples the light turning layer 905 from the diffractive layer 910. The separation layer 1007 may reduce or prevent interactions of the light emitted 1035a from the light source 1002 with the diffractive layer 910.

In some embodiments, the separation layer 1007 is excluded and the refractive index of the light-turning layer 905 is higher than that of the diffractive layer 910. In such embodiments the light-turning layer 905 may guide light therein via in part by total internal reflection from the interface between the light-turning layer 905 and the diffractive layer 910.

The embodiment shown in FIG. 10 also includes an optical isolation layer 1008 disposed between the substrate 915 and the array of display elements 901. This optical isolation layer 1008 may have an index of refraction lower than that of the layer forward of the optical isolation layer, which in this case is the substrate 915. Although the optical isolation layer 1008 is shown as a single layer, in other various embodiments the optical isolation layer comprises a multilayer stack. This optical isolation layer 1008 may comprise for example, acrylic or acrylate and acrylate polymers and copolymers including but not limited to polymethymethacrylate (PMMA) and poly(styrene-methylmethacrylate) (PS-PMMA), sold under the name of Zylar, fluorine containing polymers, and polycarbonate, other optically transmissive plastics or silicon oxide, although other materials may be used. In some embodiments, the optical isolation layer 1008 may comprise pressure sensitive adhesive. The isolation layer 1008 may be of any suitable thickness, such as, for example, between about 1 and about 100 microns or between about 1 and about 30 microns, although the isolation layer may be thicker or thinner. In another embodiment, the isolation layer 1008 may be in close vicinity of the display element 901, and comprise inorganic material with different index than the substrate 915.

In the absence of the isolation layer 1008, light diffracted by the diffractive layer 910 such as ray 920b may be incident on the array of display elements 901 instead of or in addition to being reflected as ray 920c toward the light-turning layer 905 where the light such as ray 920d is turned at near normal angles toward the display elements. The light (ray 920b) prematurely incident on the plurality of display elements 901 may be absorbed by the display elements or reflected at angles outside the field-of-view of the display device 1000. In certain embodiments, separation layer 1007 forms the lower boundary for the light from LED, while the isolation layer 1008 forms the lower boundary for the "converted" beam by the diffractive layer 910 from the ambient light 920. In certain embodiments they may be combined. Accordingly, in various embodiments, the isolation layer 1008 is positioned below the diffractive layer 910. In some embodiments, the substrate 915 may comprise the isolation layer 1008 or the optical isolation layer may be disposed elsewhere. Additionally, in some embodiments, a second substrate may be provided between the isolation layer 1008 and the display elements 901. The second substrate may serve to support the display pixels 901, while the substrate 915 may support films attached to the display.

Figure 11:
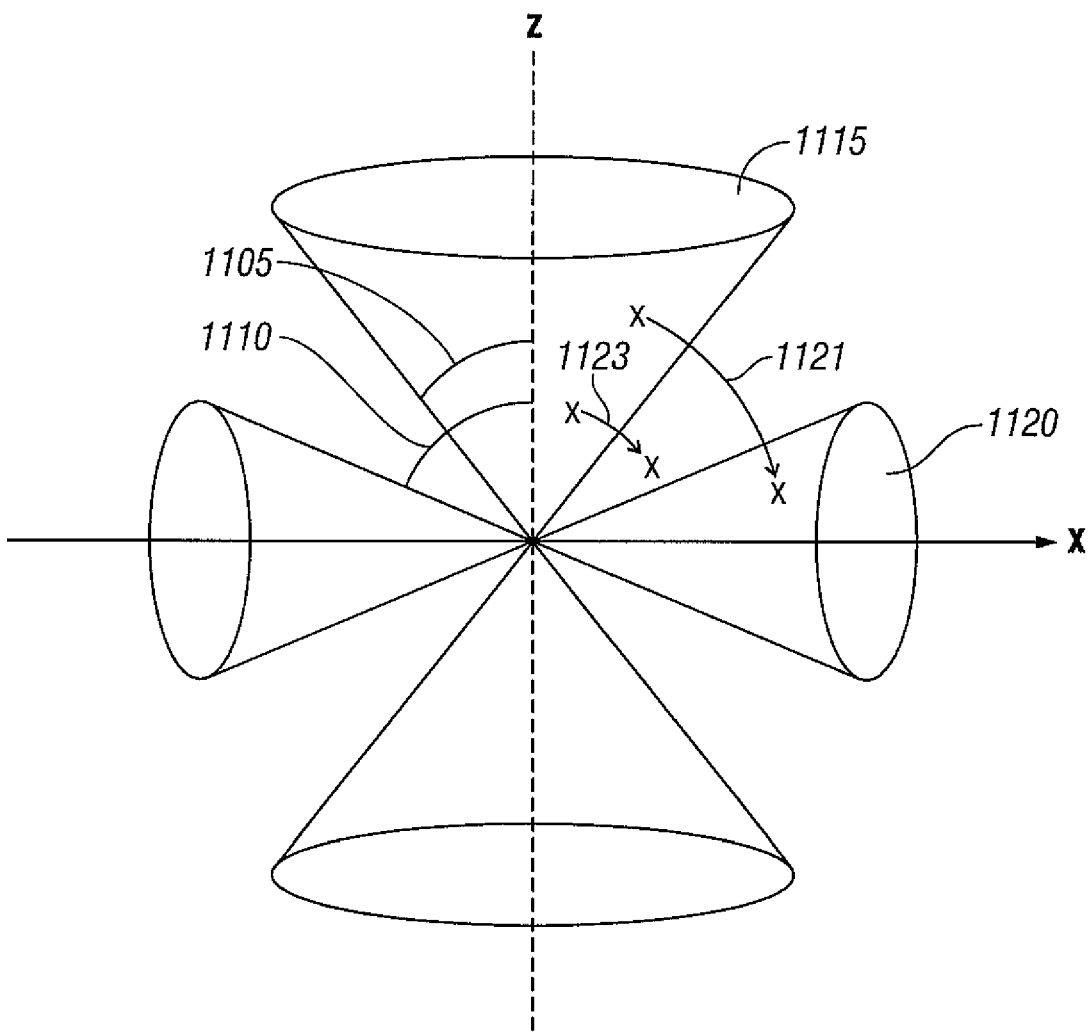
FIG. 11 schematically illustrates the field-of-view of the display device and the angular range for optical modes guided within the light guide.

FIG. 11 schematically illustrates how the illumination apparatus 1000' shown in FIG. 10 can operate. FIG. 11 includes an angular region 1115 corresponding to the direction of light within the light guiding region 1004 into which ambient light can be coupled in the absence of the angle conversion layer 910. This light, however, is not guided in the light guiding region 1004 by total internal reflection. The boundaries 1105 of this angular region 1115 are defined by the critical angle established by the interface between the light-turning layer 905 and the air above. Angles greater than this critical angle 1105 as measured from the normal (z-axis) are generally forbidden or not accessible from air without, for example, the angle conversion layer 910. This critical angle 1105 defining the angular boundary 1105 may be about 20°, about 25°, about 30°, about 35°, about 40°, about 45° or about 50° in certain embodiments although the angle should not be so limited.

FIG. 11 also includes an angular region 1120 corresponding to the direction of light within the light guiding region 1004 that is guided by the light guide region 1004. Thus, light within angular region 1120 totally internally reflects both at the interface between the light-turning layer 905 and the air above and at the interface between the light-turning layer 905 and the separation layer 1007. The boundaries 1110 of this region 1120 are defined by the critical angle established by an interface between the light-turning layer 905 and the separation layer 1007 and/or by an interface between the light-turning layer 905 and the diffractive layer 910 below. Angles greater than this critical angle 1110 as measured from the normal (z-axis) are guided by the light guide region 1004. Light incident at angles greater than this critical angle 1110 totally internally reflect at the interface between the light-turning layer 905 and the separation layer 1007. This critical angle 1110 defining the angular boundary 1110 may be approximately about 40°, about 50°, about 60°, about 65°, about 70°, about 75°, or about 80° although the angle should not be so limited.

Arrow 1123 shows the effect of another embodiment of the angle conversion layer 910. Such an angle conversion layer 910 may redirect light from a first set of angles into a third set of angles and enable ambient light directed into the light guide region 1004 to be redirected into an angle that is guided by a light guide region 1010 comprising the light-turning layer 910, the angle conversion layer 910 and the substrate 915.

Whether the ambient light turned by the angle conversion layer 910 is directed into either of the light guide regions 1004, 1010 may be determined at least in part by the angle conversion layer. Additionally, the selection of materials and corresponding index of refraction of the layers within the illumination apparatus 1000', such as the index of refraction of the angle conversion layer 910 itself may affect whether the light is guided within the light-turning layer 905 alone or is guided within the light-turning layer, the separation layer 1007, the angle conversion layer 910 and the substrate 915 or elsewhere. Alternative configurations are also possible.

A wide variety of different embodiments of the invention are possible. For example, components (e.g., layers) may be added, removed, or rearranged. Similarly, processing and method steps may be added, removed, or reordered. Also, although the terms film and layer have been used herein, such terms as used herein include film stacks and multilayers. Such film stacks and multilayers may be adhered to other structures using adhesive or may be formed on other structures using deposition or in other manners.

In certain embodiments, the light-turning features 903 may comprise different structures and may be diffractive or holographic optical elements, for example. In various embodiments, the light-turning features 903 may turn light transmitted through the light-turning features. The light-turning features 903, for example, may comprises transmissive diffractive or holographic layers that redirect light as the light is transmitted through the diffractive or holographic layer.

In some embodiments the diffractive layer 910 may be disposed forward the light-turning features 903. In various embodiments, the diffractive layer 910 may be reflective.

Still other variations are also possible.

Accordingly, while the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. An illumination apparatus comprising:
 a light guide that guides light propagating therein at an angle greater than a critical angle for the light guide and ejects light from the light guide to provide illumination;
 diffractive microstructure disposed to receive an ambient light at a first angle smaller than said critical angle and to diffract said ambient light to produce diffracted light at a second larger angle, such that said diffracted light propagates through the light guide; and
 light-turning features configured to turn the diffracted light and direct the turned light out of the light guide,
 wherein the light guide, the diffractive microstructure, and the light-turning features are disposed with respect to a spatial light modulator such that light ejected from the light guide illuminates said spatial light modulator, wherein said spatial light modulator comprises a MEMS device, wherein said MEMS device comprises interferometric modulators, wherein said MEMS device comprises first and second reflective surfaces, one of which is movable with respect to the other.

2. The illumination apparatus of claim 1, wherein said diffracting comprises reflective diffraction.

3. The illumination apparatus of claim 2, wherein said light guide comprises glass or plastic.

4. The illumination apparatus of claim 1, wherein said diffracting comprises transmissive diffraction.

5. The illumination apparatus of claim 1, wherein said light guide comprises a plate, sheet, or film.

6. The illumination apparatus of claim 1, wherein said diffractive microstructure comprise surface or volume features.

7. The illumination apparatus of claim 1, further comprising a holographic layer comprising said diffractive microstructure.

8. The illumination apparatus of claim 1, further comprising a surface diffractive layer comprising said diffractive microstructure and a planarization layer thereon.

9. The illumination apparatus of claim 8, wherein a refractive index of said planarization layer differs from a refractive index of said diffractive layer.

10. The illumination apparatus of claim 8, wherein a refractive index of said planarization layer is greater than a refractive index of said diffractive layer.

11. The illumination apparatus of claim 1, wherein the second angle is greater than said critical angle of the light guide.

12. The illumination apparatus of claim 1, wherein said light-turning features comprise prismatic or diffractive features.

13. The illumination apparatus of claim 1, wherein said light-turning features are shaped and oriented to turn the diffracted light such that the turned light is directed out of the light guide.

14. The illumination apparatus of claim 1, wherein the ambient light is transmitted through said light-turning features prior to being received by said diffractive microstructure.

15. The illumination apparatus of claim 1, further comprising a light-turning layer comprising said light-turning features, and a diffractive layer comprising said diffractive microstructure.

16. The illumination apparatus of claim 15, wherein the light-turning layer is positioned over the diffractive layer.

17. The illumination apparatus of claim 15, wherein the light-turning layer is physically separated by one or more separation layers from the diffractive layer.

18. The illumination apparatus of claim 15, wherein the refractive index of the light-turning layer is higher than the refractive index of the diffractive layer.

19. The illumination apparatus of claim 15, further comprising an isolation layer positioned below the diffractive layer, wherein the index of refraction the isolation layer is less than the index of refraction of a layer positioned on the isolation layer.

20. The illumination apparatus of claim 1, further comprising a substrate.

21. The illumination apparatus of claim 1, wherein said illumination apparatus comprises a light-turning layer comprising said light-turning features, a diffractive layer comprising said diffractive microstructure, and a substrate.

22. The illumination apparatus of claim 1, further comprising:
 a processor that is configured to communicate with said spatial light modulator, said processor being configured to process image data; and
 a memory device that is configured to communicate with said processor.

23. The illumination apparatus of claim 22, further comprising a driver circuit configured to send at least one signal to the spatial light modulator.

24. The illumination apparatus of claim 23, further comprising a controller configured to send at least a portion of the image data to the driver circuit.

25. The illumination apparatus of claim 22, further comprising an image source module configured to send said image data to said processor.

26. The illumination apparatus of claim 25, wherein the image source module comprises at least one of a receiver, transceiver, and transmitter.

27. The illumination apparatus of claim 22, further comprising an input device configured to receive input data and to communicate said input data to said processor.

28. A method of manufacturing an illumination apparatus comprising:
  providing a light guide that guides light propagating therein at an angle greater than a critical angle for the light guide and ejects light therefrom to provide illumination;
  disposing diffractive microstructure to receive an ambient light at a first angle smaller than said critical angle and to diffract said ambient light to produce diffracted light at a second larger angle, such that said diffracted light propagates through the light guide;
  providing light-turning features configured to turn the diffracted light and direct the turned light out of the light guide;
  providing a spatial light modulator; and
  disposing the light guide, the diffractive microstructure, and the light-turning features with respect to a spatial light modulator such that light ejected from the light guide illuminates said spatial light modulator,
  wherein providing the spatial modulator comprises forming a first reflective surface, and forming a second movable reflective surface.

29. The method of manufacturing of claim 28, wherein the second angle is greater than said critical angle of the light guide.

30. The method of manufacturing of claim 28, wherein disposing diffractive microstructure comprises providing a diffractive layer comprising the diffractive microstructure, and wherein providing light-turning features comprises providing a light-turning layer comprising the light-turning features.

31. The method of manufacturing of claim 30, wherein the diffractive layer comprises a holographic layer.

32. The method of manufacturing of claim 30, further comprising disposing the light-turning layer over the diffractive layer.

33. The method of manufacturing of claim 32, further comprising disposing the diffractive layer over a substrate.

34. The method of manufacturing of claim 30, further comprising disposing one or more separation layers over the diffractive layer; and disposing the light-turning layer over the one or more separation layers.

35. The method of manufacturing of claim 28, wherein said spatial light modulator comprises a MEMS device.

36. The method of manufacturing of claim 35, wherein said MEMS device comprises interferometric modulators.

37. A illumination system fabricated by the method of claim 28.

38. An illumination apparatus comprising:
  means for guiding light propagating therein at an angle greater than a critical angle for the light guiding means and ejecting light from the light guiding means to provide illumination;
  means for diffracting an ambient light received at a first angle smaller than said critical angle to produce diffracted light at a second larger angle, such that said diffracted light propagates through the light guiding means; and
  means for turning the diffracted light and directing the turned light out of said light guiding means,
  wherein the ambient light is transmitted through said turning means prior to being received by said diffracting means.

39. The illumination apparatus of claim 38, wherein said means for guiding light propagating therein at said angle greater than said critical angle for the light guiding means and ejecting light from the light guiding means to provide illumination comprises a light guide.

40. The illumination apparatus of claim 38, wherein said means for diffracting ambient light received at said first angle smaller than said critical angle to produce diffracted light at a second larger angle comprises a diffractive microstructure.

41. The illumination apparatus of claim 38, wherein said means for diffracting ambient light received at said first angle smaller than said critical angle to produce diffracted light at a second angle larger angle comprises a holographic layer.

42. The illumination apparatus of claim 38, wherein said means for turning the diffracted light and directing the turned light out of said light guide comprises light-turning features.

43. An illumination apparatus comprising:
  a light guide that guides light propagating therein at an angle greater than a critical angle for the light guide and ejects light from the light guide to provide illumination;
  diffractive microstructure disposed to receive an ambient light at a first angle smaller than said critical angle and to diffract said ambient light to produce diffracted light at a second larger angle, such that said diffracted light propagates through the light guide; and
  light-turning features configured to turn the diffracted light and direct the turned light out of the light guide, wherein the ambient light is transmitted through said light-turning features prior to being received by said diffractive microstructure.

44. A method of manufacturing an illumination apparatus comprising:
  providing a light guide that guides light propagating therein at an angle greater than a critical angle for the light guide and ejects light therefrom to provide illumination;
  disposing diffractive microstructure to receive an ambient light at a first angle smaller than said critical angle and to diffract said ambient light to produce diffracted light at a second larger angle, such that said diffracted light propagates through the light guide;
  providing light-turning features configured to turn the diffracted light and direct the turned light out of the light guide, wherein disposing diffractive microstructure comprises providing a diffractive layer comprising the diffractive microstructure, and wherein providing light-turning features comprises providing a light-turning layer comprising the light-turning features; and
  disposing the light-turning layer over the diffractive layer.

45. An illumination apparatus comprising:
- a light guide that guides light propagating therein at an angle greater than a critical angle for the light guide and ejects light from the light guide to provide illumination;
- diffractive microstructure disposed to receive ambient light at a first angle smaller than said critical angle and to diffract said ambient light to produce diffracted light at a second larger angle, such that said diffracted light propagates through the light guide;
- light-turning features configured to turn the diffracted light and direct the turned light out of the light guide; and
- a light-turning layer comprising said light-turning features, and a diffractive layer comprising said diffractive microstructure;
- wherein the light-turning layer is positioned over the diffractive layer.

46. An illumination apparatus comprising:
- a light guide that guides light propagating therein at an angle greater than a critical angle for the light guide and ejects light from the light guide to provide illumination;
- diffractive microstructure disposed to receive ambient light at a first angle smaller than said critical angle and to diffract said ambient light to produce diffracted light at a second larger angle, such that said diffracted light propagates through the light guide;
- light-turning features configured to turn the diffracted light and direct the turned light out of the light guide; and
- a light-turning layer comprising said light-turning features, and a diffractive layer comprising said diffractive microstructure;
- wherein the light-turning layer is physically separated by one or more separation layers from the diffractive layer.

47. An illumination apparatus comprising:
- a light guide that guides light propagating therein at an angle greater than a critical angle for the light guide and ejects light from the light guide to provide illumination;
- diffractive microstructure disposed to receive ambient light at a first angle smaller than said critical angle and to diffract said ambient light to produce diffracted light at a second larger angle, such that said diffracted light propagates through the light guide;
- light-turning features configured to turn the diffracted light and direct the turned light out of the light guide;
- a light-turning layer comprising said light-turning features, and a diffractive layer comprising said diffractive microstructure; and
- an isolation layer positioned below the diffractive layer, wherein the index of refraction of the isolation layer is less than the index of refraction of a layer positioned on the isolation layer.

48. A method of manufacturing an illumination apparatus comprising:
- providing a light guide that guides light propagating therein at an angle greater than a critical angle for the light guide and ejects light therefrom to provide illumination;
- disposing diffractive microstructure to receive an ambient light at a first angle smaller than said critical angle and to diffract said ambient light to produce diffracted light at a second larger angle, such that said diffracted light propagates through the light guide;
- providing light-turning features configured to turn the diffracted light and direct the turned light out of the light guide,
- wherein disposing diffractive microstructure comprises providing a diffractive layer comprising the diffractive microstructure, and wherein providing light-turning features comprises providing a light-turning layer comprising the light-turning features, and
- further comprising disposing one or more separation layers over the diffractive layer and disposing the light-turning layer over the one or more separation layers.

* * * * *

UNITED STATES PATENT AND TRADEMARK OFFICE
CERTIFICATE OF CORRECTION

PATENT NO. : 8,040,589 B2
APPLICATION NO. : 12/369630
DATED : October 18, 2011
INVENTOR(S) : Bita et al.

It is certified that error appears in the above-identified patent and that said Letters Patent is hereby corrected as shown below:

Title Page, Item (57) in Abstract, line 9, please change "for of" to --of the--.

In Col. 1, line 21, please change "and or" to --and/or--.

In Col. 6, line 49, please change "respectively" to --respectively.--.

In Col. 8, line 6, please change "ore" to --or--.

In Col. 12, line 58, please change "field-of-views" to --field of view--.

In Col. 14, line 26, please change "intereferometric" to --interferometric--.

In Col. 14, line 42, please change "methymethacrylate" to --methylmethacrylate--.

In Col. 14, line 62, please change "acylates" to --acrylates--.

In Col. 18, line 65, please change "may" to --may include--.

In Col. 19, line 4, please change "polymethymethacrylate" to --polymethylmethacrylate--.

In Col. 19, line 57, please change "polymethymethacrylate" to --polymethylmethacrylate--.

In Col. 22, line 52, Claim 19, please change "the" to --of the--.

In Col. 24, line 29, Claim 41, please change "second angle" to --second--.

Signed and Sealed this
Tenth Day of April, 2012

David J. Kappos
*Director of the United States Patent and Trademark Office*